US012746527B2

(12) United States Patent
Shirman et al.

(10) Patent No.: US 12,746,527 B2
(45) Date of Patent: Sep. 29, 2026

(54) GRANULATED HIERARCHICAL MATERIAL STRUCTURE

(71) Applicant: Metalmark Innovations, PBC, Cambridge, MA (US)

(72) Inventors: Tanya Shirman, Winchester, MA (US); Sissi Liu, Arlington, MA (US); Elijah Shirman, Winchester, MA (US)

(73) Assignee: Metalmark Innovations, PBC, Cambridge, MA (US)

( * ) Notice: Subject to any disclaimer, the term of this patent is extended or adjusted under 35 U.S.C. 154(b) by 130 days.

(21) Appl. No.: 18/444,001

(22) Filed: Feb. 16, 2024

(65) Prior Publication Data

US 2024/0269645 A1 Aug. 15, 2024

Related U.S. Application Data

(63) Continuation-in-part of application No. PCT/US2022/052466, filed on Dec. 9, 2022.

(60) Provisional application No. 63/316,853, filed on Mar. 4, 2022, provisional application No. 63/287,717, filed on Dec. 9, 2021.

(51) Int. Cl.

| | |
|---|---|
| ***B01J 20/14*** | (2006.01) |
| ***B01D 39/20*** | (2006.01) |
| ***B01J 20/28*** | (2006.01) |

(52) U.S. Cl.

CPC .......... *B01J 20/14* (2013.01); *B01D 39/2068* (2013.01); *B01J 20/28007* (2013.01); *B01J 20/2803* (2013.01); *B01D 2239/0407* (2013.01); *B01D 2239/0485* (2013.01)

(58) Field of Classification Search

None

See application file for complete search history.

(56) References Cited

U.S. PATENT DOCUMENTS

| | | | | |
|---|---|---|---|---|
| 2004/0055957 | A1* | 3/2004 | Palm | B01D 39/06 210/660 |
| 2012/0003146 | A1 | 1/2012 | Fliermans | |
| 2017/0190139 | A1 | 7/2017 | Haghdoost et al. | |
| 2018/0104670 | A1* | 4/2018 | Stabler | B01J 20/14 |
| 2021/0154606 | A1 | 5/2021 | Yan et al. | |
| 2021/0205803 | A1* | 7/2021 | Shirman | B22F 1/052 |

FOREIGN PATENT DOCUMENTS

| | | | |
|---|---|---|---|
| JP | 4853816 | B2 | 1/2012 |
| KR | 20140141738 | A | 12/2014 |
| WO | 2023107726 | A1 | 6/2023 |

OTHER PUBLICATIONS

International Search Report and Written Opinion issued in International Appln. No. PCT/US2025/015659 dated May 7, 2025.

(Continued)

*Primary Examiner* — Chinessa T. Golden

(74) *Attorney, Agent, or Firm* — Potomac Law Group, PLLC; Reza Mollaaghababa

(57) ABSTRACT

In one aspect, a composition is disclosed that includes an agglomeration of a plurality of porous microparticles forming a hierarchically porous material structure. The porous microparticles can be formed of a biogenic and/or a synthetic material. In some embodiments, a plurality of binder can be distributed among the microparticles to facilitate the agglomeration of the plurality of the microparticles.

24 Claims, 18 Drawing Sheets

(56) References Cited

OTHER PUBLICATIONS

International Invitation to Pay Additional fees and Partial Search Report, PCT/US2022/052466, dated Mar. 31, 2023, 18 pages.
International Preliminary Report on Patentability mailed Dec. 8, 2023 for International Patent Application No. PCT/US2022/052466.
International Search Report and Written Opinion, PCT/US2022/052466, dated May 25, 2023, 26 pages.
Sun Minghui et al: "Hierarchically porous materials: Synthesis strategies and emerging applications", Frontiers of Chemical Science and Engineering, Higher Education Press, Heidelberg, vol. 10, No. 3, Aug. 21, 2016 (Aug. 21, 2016), pp. 301-347.
Vazirinasab E et al: "A non-fluorinated mechanochemically robust volumetric superhydrophobic nanocomposite", Journal of Materials Science & Technology, Allerton Press, Amsterdam, NL, vol. 66, Jul. 24, 2020 (Jul. 24, 2020), pp. 213-225.

* cited by examiner

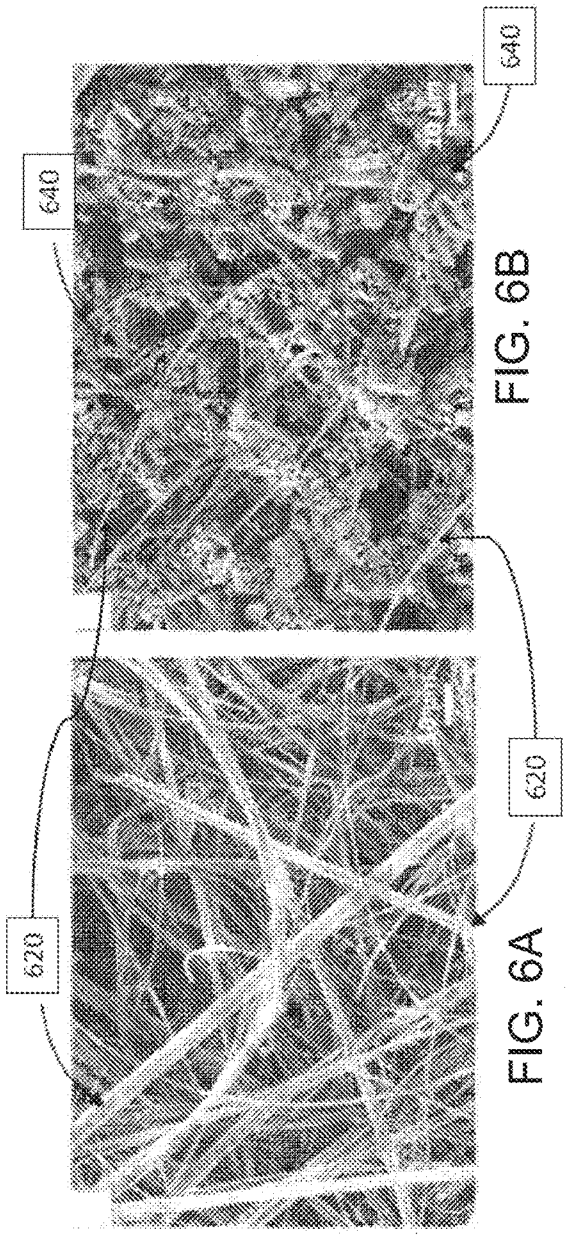
FIG. 6B
FIG. 6A
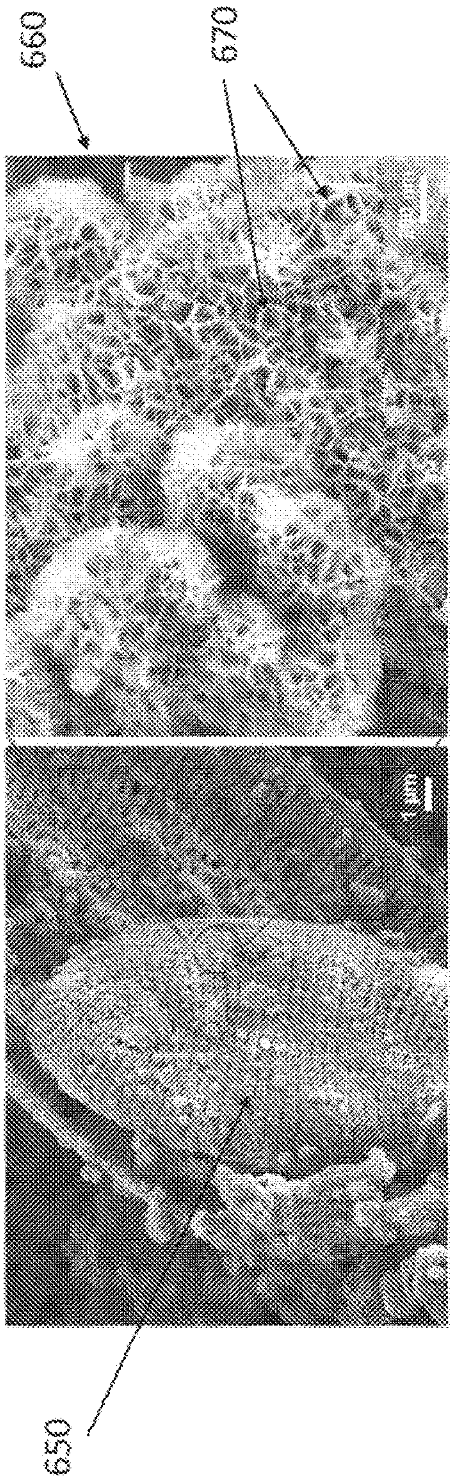
FIG. 6D
FIG. 6C

Filtration System Diagram

GRANULATED HIERARCHICAL MATERIAL STRUCTURE

RELATED APPLICATIONS

This non-provisional application claims the benefit of priority, as a continuation-in-part application, in International Patent Application PCT/US2022/052466, which in turn claims the benefit of priority in U.S. provisional application No. 63/287,717, filed Dec. 9, 2021, and entitled "Hierarchical Material Structure Having Mechano-Biocidal Properties for Pathogen Inactivation," and also in U.S. provisional application No. 63/316,853, filed Mar. 4, 2022, and entitled "Diatomaceous Earth Coated Filter Media With Renewal Function For Air Purification," the entire contents of all of the above applications are incorporated herein by reference.

STATEMENT REGARDING FEDERALLY SPONSORED RESEARCH OR DEVELOPMENT

This invention was made with government support under grant number 2026128 awarded by the National Science Foundation. The government has certain rights in the invention.

TECHNICAL FIELD

The present disclosure relates to systems or compositions for treating contaminants, and more particularly to systems and compositions that include hierarchical material structures or nanoscale features for treating contaminants.

BACKGROUND

Rationally designed hierarchically structured materials with controlled discontinuities from nanometer to the macro scale display unprecedented mechanical, physical, and chemical properties. Such materials may provide significant breakthroughs in many applications including optics, catalysis, semiconductors, energy storage, pollution abatement, and many more. The ability to produce such complex (multiphasic and nanostructured) materials may depend on developing ways to form microstructures with controlled composition and morphologies, and in significant quantities. As the compositions of the materials become more complex while their structural variations get smaller, their preparation may get more complicated and harder to control and may require sophisticated instrumentation and high energy input. In addition, such materials may not be easily amenable to scale-up to allow wide-scale applications. Moreover, in many instances, producing these materials may also generate toxic byproducts.

SUMMARY

Some embodiments relate to a composition, including: a hierarchically structured material; and a plurality of nanoscale features disposed on at least a portion of a surface of the hierarchically structured material, wherein: the plurality of nanoscale features includes a barbed morphology; and the hierarchically structured material is configured to treat a plurality of contaminants.

Some embodiments relate to a composition, wherein the hierarchically structured material includes a material of natural origin.

Some embodiments relate to a composition, wherein the hierarchically structured material of natural origin includes Diatomaceous Earth.

Some embodiments relate to a composition, wherein the hierarchically structured material includes a material of synthetic origin.

Some embodiments relate to a composition, wherein: the plurality of contaminants include pathogens; and the plurality of nanoscale features are configured to treat the pathogens.

Some embodiments relate to a composition, wherein the plurality of nanoscale features includes a nanostructured coating.

Some embodiments relate to a composition, wherein the hierarchically structured material includes a mixture of material of synthetic and natural origin.

Some embodiments relate to a composition, wherein the nanostructured coating exhibits a catalytic function.

Some embodiments relate to a composition, wherein the nanostructured coating is configured to treat any of gaseous and particulate contaminants.

Some embodiments relate to a composition, wherein the nanostructured coating is at least partially coated with a secondary coating.

Some embodiments relate to a composition, wherein the secondary coating includes an inorganic material.

Some embodiments relate to a composition, wherein the secondary coating enhances a catalytic function, a sorption function, or a biocidal function.

Some embodiments relate to a composition, wherein the nanostructured coating exhibits a sorption function.

Some embodiments relate to a composition, wherein the nanostructured coating exhibits sorption and storage of $CO_2$.

Some embodiments relate to a composition, wherein the hierarchically structured material includes a plurality of microparticles.

Some embodiments relate to a composition, wherein the plurality of microparticles have sizes between about 1 micron to about 50 microns.

Some embodiments relate to a composition, wherein a type of the plurality of contaminants is one or more of pathogens, particulates, and gaseous molecules.

Some embodiments relate to a composition, wherein the pathogens include one or more of a virus, a bacterium, and fungi.

Some embodiments relate to a composition, wherein the plurality of contaminants is included in a flowing medium.

Some embodiments relate to a composition, wherein the flowing medium includes one or more of a gas or a liquid.

Some embodiments relate to a composition, wherein the flowing medium includes aqueous medium.

Some embodiments relate to a composition, wherein the flowing medium includes one or more bodily fluids.

Some embodiments relate to a composition, wherein the nanoscale features have sizes between about 1 nm to about 30 nm.

Some embodiments relate to a composition, wherein the hierarchically structured material defines a plurality of interconnected pores, and the interconnected pores have cross-sectional dimensions between about 50 nm to about 10 microns.

Some embodiments relate to a composition, wherein a first composition of the hierarchically structured material is substantially the same as a second composition of the plurality of nanoscale features.

Some embodiments relate to a composition, wherein a first composition of the hierarchically structured material is different from a second composition of the plurality of nanoscale features.

Some embodiments relate to a system, wherein a composition of the plurality of nanoscale features includes any of oxides, mixed oxides, transition metal oxides, zeolites, oxohydroxides, aluminates, silicates, alumosilicates, titanates, oxo-metallates, vanadia, silica, ceria, alumina, titania, zirconia, nickel oxide, copper oxide, cobalt oxide, tin oxide, manganese oxide, magnesium oxide, noble metal oxides, platinum group metal oxides, molybdenum oxides, tungsten oxides, rhenium oxides, chromium oxides, rare earth oxides, and any combinations thereof.

Some embodiments relate to a composition, wherein the material of synthetic origin includes any of oxides, mixed oxides, mixed oxides of elements from one or more groups I, II, III, IV V, VI, zeolites, oxohydroxides, aluminates, silicates, alumosilicates, titanates, oxometallates, metal-organic frameworks, vanadia, silica, alumina, titania, zirconia, hafnia, nickel oxide, ceria, cobalt oxide, tin oxide, manganese oxide, magnesium oxide, noble metal oxides, platinum group metal oxides, molybdenum oxides, tungsten oxides, rhenium oxides, tantalum oxide, niobium oxide, chromium oxides, scandium, yttrium, lanthanum, thorium, rare earth oxides, and any combinations thereof.

Some embodiments relate to a composition, wherein a composition of the plurality of nanoscale features includes any of oxides, mixed oxides, transition metal oxides, zeolites, oxohydroxides, aluminates, silicates, alumosilicates, titanates, oxo-metallates, vanadia, silica, alumina, titania, zirconia, nickel oxide, cobalt oxide, copper oxide, tin oxide, manganese oxide, magnesium oxide, noble metal oxides, platinum group metal oxides, molybdenum oxides, tungsten oxides, rhenium oxides, chromium oxides, rare earth oxides, and any combinations thereof.

Some embodiments relate to a composition, further including one or more active materials disposed on at least a subset of the plurality of nanoscale features includes both hierarchically structured material of natural and synthetic origin.

Some embodiments relate to a composition, wherein the one or more active materials enhance a sorption function.

Some embodiments relate to a composition, wherein the one or more active materials enhance a biocidal function.

Some embodiments relate to a composition, wherein the one or more active materials enhance a catalytic function.

Some embodiments relate to a composition, wherein one or more compositions of the one or more active materials include one or more of catalytic nanoparticle, zeolite, MOFs, organic, inorganic, or polymer.

Some embodiments relate to a system including: a macroscopic porous substrate defining a plurality of pores; and a composition deposited on internal surfaces of at least some of the plurality of pores, wherein the composition includes a hierarchically structured material exhibiting surface nanostructured features.

Some embodiments relate to a system, wherein the composition includes: a hierarchically structured material; and a plurality of nanoscale features disposed on at least a portion of a surface of the hierarchically structured material, wherein: the plurality of nanoscale features includes a barbed morphology; and the hierarchically structured material is configured to treat a plurality of contaminants.

Some embodiments relate to a system, wherein the macroscopic porous substrate includes a metal or a metal alloy.

Some embodiments relate to a system, wherein the metal includes an alloy.

Some embodiments relate to a system, wherein the macroscopic porous substrate includes one or any combination of stainless steel, ferritic steel, an iron-chromium alloy, austenitic steel, a chromium-nickel alloy, copper, nickel, brass, gold, silver, titanium, tungsten, aluminum, palladium, and platinum.

Some embodiments relate to a system, wherein the composition forms a coating of the internal surfaces of at least some of the plurality of pores.

Some embodiments relate to a system, wherein the coating has a thickness between about 10 microns and about 100 microns.

Some embodiments relate to a system, wherein the coating is formed as a substantially continuous film.

Some embodiments relate to a system, wherein the coating is formed as a plurality of discontinuous segments.

Some embodiments relate to a system, wherein the plurality of pores have sizes between about 100 nm and about 5 mm.

Some embodiments relate to a system, wherein the macroscopic porous substrate includes a ceramic.

Some embodiments relate to a system, wherein the macroscopic porous substrate includes a filter.

Some embodiments relate to a system, wherein the macroscopic porous substrate includes a non-woven medium.

Some embodiments relate to a system, wherein the macroscopic porous substrate includes a woven medium.

Some embodiments relate to a system, wherein the macroscopic porous substrate includes fiberglass.

Some embodiments relate to a system, wherein the ceramic includes one or any combination of cordierite, Mullite, zeolite, natural, and synthetic clay.

Some embodiments relate to a system, wherein the macroscopic porous substrate includes one or any combination of cellulose, natural rubber, latex, wool, cotton, silk, linen, hemp, flax, feather fiber, and any other natural material.

Some embodiments relate to a system, wherein the macroscopic porous substrate includes one or any combination of any of natural or synthetic fabrics and textiles.

Some embodiments relate to a system, wherein the macroscopic porous substrate includes a particulate filter.

Some embodiments relate to a system, wherein the hierarchically structured material includes a material of natural origin.

Some embodiments relate to a system, wherein the hierarchically structured material of natural origin includes Diatomaceous Earth.

Some embodiments relate to a system, wherein the hierarchically structured material includes a material of synthetic origin.

Some embodiments relate to a system, wherein the material of synthetic origin includes any of oxides, mixed oxides, mixed oxides of elements from one or more groups I, II, III, IV V, VI, zeolites, oxohydroxides, aluminates, silicates, alumosilicates, titanates, oxometallates, metal-organic frameworks, vanadia, silica, alumina, titania, zirconia, hafnia, nickel oxide, cobalt oxide, cobalt oxide, tin oxide, manganese oxide, magnesium oxide, noble metal oxides, platinum group metal oxides, molybdenum oxides, tungsten oxides, rhenium oxides, tantalum oxide, niobium oxide, chromium oxides, scandium, yttrium, lanthanum, thorium, rare earth oxides, and any combinations thereof.

Some embodiments relate to a system, wherein: the plurality of contaminants include pathogens; and the plurality of nanoscale features are configured to treat the pathogens.

Some embodiments relate to a system, wherein the plurality of nanoscale features includes a nanostructured coating.

Some embodiments relate to a system, wherein the nanostructured coating exhibits a catalytic function.

Some embodiments relate to a system, wherein the nanostructured coating is configured to treat any of gaseous and particulate contaminants.

Some embodiments relate to a system, wherein the nanostructured coating is at least partially coated with a secondary coating.

Some embodiments relate to a system, wherein the secondary coating includes an inorganic material.

Some embodiments relate to a system, wherein the hierarchically structured material includes a plurality of microparticles.

Some embodiments relate to a system, wherein the plurality of microparticles have sizes between about 1 micron to about 50 microns.

Some embodiments relate to a system, wherein a type of the plurality of contaminants is one or more of pathogens, particulates, and gaseous molecules.

Some embodiments relate to a system, wherein the pathogens include one or more of a virus, a bacterium, and fungi.

Some embodiments relate to a system, wherein the plurality of contaminants are included in a flowing medium.

Some embodiments relate to a system, wherein the flowing medium includes one or more of a gas or a liquid.

Some embodiments relate to a system, wherein the flowing medium includes aqueous medium.

Some embodiments relate to a system, wherein the flowing medium includes one or more bodily fluids.

Some embodiments relate to a system, wherein the nanoscale features have sizes between about 1 nm to about 30 nm.

Some embodiments relate to a system, wherein the hierarchically structured material defines a plurality of interconnected pores, and the interconnected pores have cross-sectional dimensions between about 50 nm to about 10 microns.

Some embodiments relate to a system, wherein a first composition of the hierarchically structured material is substantially the same as a second composition of the plurality of nanoscale features.

Some embodiments relate to a system, wherein a first composition of the hierarchically structured material is different from a second composition of the plurality of nanoscale features.

Some embodiments relate to a system including: a macroscopic porous substrate defining a plurality of pores; and a plurality of nanoscale features disposed on at least a portion of internal walls of the plurality of pores, wherein: the plurality of nanoscale features include a barbed morphology; and the plurality of nanoscale features are configured to treat a plurality of contaminants.

Some embodiments relate to a system, further including one or more active materials disposed on at least a subset of the plurality of nanoscale features.

Some embodiments relate to a system, wherein the hierarchically structured material includes a material of synthetic origin and a material of natural origin.

Some embodiments relate to a system, wherein the plurality of pores have sizes between about 100 nm and about 5 mm.

Some embodiments relate to a system, wherein the macroscopic porous substrate includes a ceramic.

Some embodiments relate to a system, wherein the macroscopic porous substrate includes a metal or a metal alloy.

Some embodiments relate to a system, wherein the macroscopic porous substrate includes a filter.

Some embodiments relate to a system, wherein the macroscopic porous substrate includes a non-woven medium.

Some embodiments relate to a system, wherein the macroscopic porous substrate includes a woven medium.

Some embodiments relate to a system, wherein the macroscopic porous substrate includes fiberglass Some embodiments relate to a system, wherein the macroscopic porous substrate includes a ceramic.

Some embodiments relate to a system, wherein the ceramic includes one or any combination of cordierite, Mullite, zeolite, natural, and synthetic clay.

Some embodiments relate to a system, wherein the macroscopic porous substrate includes a metal.

Some embodiments relate to a system, wherein the metal includes an alloy.

Some embodiments relate to a system, wherein the macroscopic porous substrate includes one or any combination of stainless steel, ferritic steel, an iron-chromium alloy, austenitic steel, a chromium-nickel alloy, copper, nickel, brass, gold, silver, titanium, tungsten, aluminum, palladium, and platinum.

Some embodiments relate to a system, wherein the macroscopic porous substrate includes one or any combination of cellulose, natural rubber, latex, wool, cotton, silk, linen, hemp, flax, feather fiber, and any other natural material.

Some embodiments relate to a system, wherein the macroscopic porous substrate includes one or any combination of any of natural or synthetic fabrics and textiles.

Some embodiments relate to a system, wherein the macroscopic porous substrate includes a particulate filter.

Some embodiments relate to a system, wherein the plurality of contaminants include pathogens.

Some embodiments relate to a system, wherein the plurality of nanoscale features includes a nanostructured coating.

Some embodiments relate to a system, wherein the nanostructured coating exhibits a catalytic function.

Some embodiments relate to a system, wherein the nanostructured coating is configured to treat any of gaseous and particulate contaminants.

Some embodiments relate to a system, wherein the nanostructured coating is at least partially coated with a secondary coating.

Some embodiments relate to a system, wherein the secondary coating includes an inorganic material.

Some embodiments relate to a system, wherein a type of the plurality of contaminants is one or more of pathogens, particulates, and gaseous molecules.

Some embodiments relate to a system, wherein the pathogens include one or more of a virus, a bacterium, and fungi.

Some embodiments relate to a system, wherein the plurality of contaminants are included in a flowing medium.

Some embodiments relate to a system, wherein the flowing medium includes one or more of a gas or a liquid.

Some embodiments relate to a system, wherein the flowing medium includes aqueous medium.

Some embodiments relate to a system, wherein the flowing medium includes one or more bodily fluids.

Some embodiments relate to a system, wherein the nanoscale features have sizes between about 1 nm to about 30 nm.

Some embodiments relate to a system, further including one or more active materials disposed on at least a subset of the plurality of nanoscale features.

Some embodiments relate to a composition, wherein the inorganic material includes any of a metal, a metal oxide, silica, zeolites and activated carbon.

Some embodiments relate to a composition, wherein the metal oxide includes silver oxide, copper oxide, and manganese oxide.

Some embodiments relate to a composition, wherein the nanostructured coating includes catalytic nanoparticles imparting the catalytic function thereto.

Some embodiments relate to a composition, wherein the catalytic nanoparticles include metal nanoparticles.

Some embodiments relate to a composition, wherein the metal nanoparticles include any of gold, silver, platinum, palladium, ruthenium, rhodium, cobalt, iron, nickel, copper, chromium, tungsten, molybdenum, vanadium, titanium, zirconium, bimetals, metal alloys.

Some embodiments relate to a composition, wherein the metal nanoparticles include a metal compound.

Some embodiments relate to a composition, wherein the metal compound includes any of a pnictide, a hydroxide, a binary and complex salt or combinations thereof.

Some embodiments relate to a hierarchical material, wherein said hierarchical material is in a form of powder particles.

Some embodiments relate to a hierarchical material, wherein said powder particles exhibit a size in a range of about 1 micron to about 50 microns.

Some embodiments relate to a hierarchical material, wherein said interconnected pores of said matrix exhibit a surface area to weight ratio in a range of about 10 $m^2/g$ to about 1,000 $m^2/g$.

Some embodiments relate to a hierarchical material, wherein said interconnected pores of said matrix exhibit a surface area to weight ratio in a range of about 100 $m^2/g$ to about 500 $m^2/g$.

Some embodiments relate to a hierarchical material, wherein said matrix and said nanoscale features are formed with a substantially same composition.

Some embodiments relate to a hierarchical material, wherein said matrix and said nanoscale features are formed with different compositions.

Some embodiments relate to a hierarchical material, wherein said nanoscale features include $MoS_2$.

Some embodiments relate to a hierarchical material, wherein said matrix includes any of a synthetic polymer, a natural polymer, a bio-polymer, and any combinations thereof.

Some embodiments relate to a hierarchical material, wherein said matrix includes one or more biogenic materials.

Some embodiments relate to a hierarchical material, wherein said biogenic materials include any of diatomaceous earth, pollen, silica-based microparticles of biological origin, and any combinations thereof.

Some embodiments relate to a hierarchical material, wherein one or more active materials are further disposed on an inner surface of at least some of said pores of said matrix.

Some embodiments relate to a hierarchical material, wherein said active materials include catalytic nanoparticles.

Some embodiments relate to a hierarchical material, wherein said coating exhibits a thickness in a range of about 1 micron to about 200 microns.

Some embodiments relate to a hierarchical material, wherein said macroscopic porous substrate has pore sizes in a range of about 400 nm to about 3 mm.

Some embodiments relate to a hierarchical material, wherein said macroscopic porous substrate has pore sizes in a range of about 600 nm to about 1 mm.

Some embodiments relate to a hierarchical material, wherein said macroscopic porous substrate has pore sizes in a range of about 800 nm to about 0.8 mm.

Some embodiments relate to a hierarchical material, wherein said macroscopic porous substrate has pore sizes in a range of about 1,000 nm to about 500 microns.

Some embodiments relate to a hierarchical material, wherein said macroscopic porous substrate has pore sizes in a range of about 2,000 nm to about 200 microns.

Some embodiments relate to a hierarchical material, wherein said macroscopic porous substrate has pore sizes in a range of about 2,500 nm to about 100 microns.

Some embodiments relate to a hierarchical material, wherein said macroscopic porous substrate includes one or more channels that exhibit a length in a range of about 1 mm to about 1 m.

Some embodiments relate to a hierarchical material, wherein said channels of said macroscopic porous substrate have a substantially linear or an arcuate shape.

Some embodiments relate to a hierarchical material, wherein at least a portion of said channels are parallel to one another.

Some embodiments relate to a hierarchical material, wherein at least a portion of said channels intersect one another so as to provide a pattern of interconnected channels.

Some embodiments relate to a hierarchical material, wherein said macroscopic porous substrate includes any of polyurethane, polystyrene, poly(methyl methacrylate), polyacrylate, poly(alkyl acrylate), substituted polyalkylacrylate, polystyrene, poly(divinylbenzene), polyvinylpyrrolidone, poly(vinylalcohol), polyacrylamide, poly(ethylene oxide), polyvinyl chloride, polyvinylidene fluoride, polytetrafluoroethylene, other halogenated polymers, hydrogels, organogels, any other polymer, and any combinations thereof.

Some embodiments relate to a hierarchical material, wherein said macroscopic porous substrate includes any of a random copolymer, a block copolymer, a branched polymer, a star polymer, a dendritic polymer, a supramolecular polymer, and any combinations thereof.

Some embodiments relate to a hierarchical material, wherein said macroscopic porous substrate has pore sizes in a range of about 2,500 nm to about 100 microns.

Some embodiments relate to a method of fabricating a hierarchical material for entrapment and inactivation of pathogens, including: preparing a solution by dispersing matrix precursors and core-shell templating colloids in a solvent; and drying and calcining said solution to fabricate said hierarchical material.

Some embodiments relate to a method, wherein said hierarchical material is formed as hierarchically structured porous powders.

Some embodiments relate to a method, further including: applying said hierarchically structured porous powders onto a substrate.

Some embodiments relate to a method, further including: applying said solution to a macroscopic porous substrate prior to said drying and calcining step.

Some embodiments relate to a method, wherein said solution is applied to said macroscopic porous substrate via dip coating.

Some embodiments relate to a method, wherein said core-shell templating colloids include a polymer colloid core that is coated with nano features-forming (NFF) material.

Some embodiments relate to a method, wherein said polymer colloid core includes polystyrene.

Some embodiments relate to a method, wherein said NRF material coating exhibits a thickness in a range of about 10 nm to about 30 nm.

Some embodiments relate to a method, wherein said solvent includes water.

Some embodiments relate to a method, wherein said drying and calcining is performed at a temperature in a range of about 100° C. to about 500° C.

An aspect of the present teachings provides a hierarchical material for entrapment and inactivation of pathogens. In some embodiments, the hierarchical material can include a matrix having a plurality of interconnected pores, and a plurality of nanoscale features disposed at surfaces of the pores. In particular, the pores of the matrix can be configured for entrapment of at least some of the pathogens, if any, present in a flowing medium, and the nanoscale features can be configured for inactivation of the pathogens by, e.g., incision of membranes of the pathogens.

In a related aspect of the present teachings, a method of fabricating such a hierarchical material is provided. The fabrication method can include preparing a solution, which comprises matrix precursors and core-shell templating colloids, and thermally treating the solution to fabricate the hierarchical material.

Another aspect of the present teachings provides a hierarchical material, including a macroscopic porous substrate, and a plurality of nanoscale features disposed on internal surfaces of at least some pores of the macroscopic porous substrate. The pores of the macroscopic porous substrate can be configured for entrapment of the pathogens, if any, present in a flowing medium, and the nanoscale features can be configured for inactivation of the pathogens by, e.g., incision of membranes of the pathogens.

A related aspect of the present teachings provides a method of fabricating such a hierarchical material, including submerging a macroscopic porous substrate in a solution that contains nanoroughness-forming precursors, removing the macroscopic porous substrate from the solution, and drying and calcining the macroscopic porous substrate to allow the nanoroughness-forming precursors to form a plurality of nanoscale features that exhibit nano-roughness on surfaces of the macroscopic porous substrate In one aspect, a filter is disclosed, which includes a porous filtering structure and a DE coating that is disposed on at least a surface portion of the porous filtering structure. As discussed in more detail below, the porous filtering structure may provide filtering of contaminants such as viruses and other pathogens by itself (i.e., without the DE coating). In some embodiments, the combination of the porous filtering structure and the DE coating may exhibit a greater filtration efficiency relative to that of the porous structure without the DE coating.

The porous structure may be in the form of woven or non-woven filter media. For example, in some embodiments, the porous structure may be formed of ceramic, metal, a polymeric material, fiberglass, or any combination thereof.

In some embodiments, the DE coating may improve the filtration efficiency of the bare filter media (i.e., the porous structure without the DE coating).

In some aspects, the techniques described herein relate to a composition, wherein the secondary coating enhances a sorption function and storage of $CO_2$.

In some aspects, the techniques described herein relate to a system, wherein the hierarchically structured material is a material of synthetic and/or natural origin.

In some aspects, the techniques described herein relate to a composition, wherein the secondary coating enhances a catalytic function, a sorption function, or a biocidal function.

In some aspects, the techniques described herein relate to a composition, wherein the secondary coating enhances a sorption function and storage of $CO_2$.

In some aspects, the techniques described herein relate to a composition, further including one or more active materials disposed on at least a subset of the plurality of nanoscale features.

In some aspects, the techniques described herein relate to a composition, wherein the one or more active materials enhance a sorption function.

In some aspects, the techniques described herein relate to a composition, wherein the one or more active materials enhance a biocidal function.

In some aspects, the techniques described herein relate to a composition, wherein the one or more active materials enhance a catalytic function.

In some aspects, the techniques described herein relate to a composition, wherein one or more compositions of the one or more active materials include one or more of catalytic nanoparticle, zeolite, MOFs, organic, inorganic, or polymer.

In some aspects, the techniques described herein relate to a composition, wherein a composition of the plurality of nanoscale features includes any of oxides, mixed oxides, transition metal oxides, zeolites, oxohydroxides, aluminates, silicates, alumosilicates, titanates, oxo-metallates, vanadia, silica, ceria, alumina, titania, zirconia, nickel oxide, cobalt oxide, tin oxide, manganese oxide, magnesium oxide, noble metal oxides, platinum group metal oxides, molybdenum oxides, tungsten oxides, rhenium oxides, chromium oxides, rare earth oxides, and any combinations thereof.

In one aspect, a composition is disclosed, which includes an agglomeration of a plurality of microparticles forming a hierarchically porous material structure. In some embodiments, the microparticles can have a porous structure. By way of example, the pore sizes of the porous microparticles can have sizes in a range of about 50 nm to about 10 microns. In some embodiments, the microparticles can include one or more biogenic materials. By way of example, and without limitation, a suitable example of a biogenic material is Diatomaceous Earth (DE). In other embodiments, the microparticles can include one or more synthetic materials. Further, in some embodiments, the microparticles can include a combination of one or more biogenic and one or more synthetic materials.

Some examples of suitable synthetic materials include, without limitation, any of metal oxides, mixed metal oxides, mixed oxides of elements from one or more groups I, II, III, IV, V, VI, zeolites, oxohydroxides, aluminates, silicates, aluminosilicates, titanates, oxometallates, metal-organic frameworks, vanadia, silica, alumina, titania, zirconia, hafnia, nickel oxide, cobalt oxide, copper oxide, iron oxide, tin oxide, manganese oxide, magnesium oxide, noble metal oxides, platinum group metal oxides, molybdenum oxides, rhenium oxides, tantalum oxide, niobium oxide, chromium oxides, scandium, yttrium, lanthanum, thorium, rare earth oxides, and any combination thereof.

In some embodiments, at least one of the plurality of the microparticles includes a first plurality of nanoscale features that are disposed on at least a surface portion of the microparticles. In some embodiments, at least one of the plurality of the microparticles includes first and second plurality of nanoscale features disposed on at least a portion thereof. By way of example, such first and second plurality of nanoscale features can exhibit different pore sizes so as to collectively provide a hierarchical porous structure, e.g., in the form of a composite coating, on the surface of the microparticles. By way of example, the first plurality of the nanoscale features can form a first nanostructured coating disposed on one or more of the microparticles and the second plurality of the nanoscale features can form a second nanostructured coating disposed on the first nanostructured coating.

In some embodiments, one or more nanostructured coatings disposed on one or more of the microparticles can be configured to provide any of a catalytic and a sorption function. By way of example, such nanostructured coating can be configured to provide sorption and/or storage of $CO_2$.

In some embodiments, such a nanostructured coating can be configured to provide sorption and/or storage of methane ($CH_4$), $H_2S$, nitrogen oxides, or other sulfur or nitrogen compounds.

In some embodiments, such a nanostructured coating can be configured to provide sorption and/or storage of volatile or semi-volatile organic compounds. By way of example, such nanostructured coating can be configured to provide sorption and/or storage of formaldehyde, acetaldehyde, alcohols, acrolein, and poly-aromatic hydrocarbons.

In some embodiments, such a nanostructured coating can be configured to provide sorption and/or storage of pollutants originated from smoke, e.g. wildfire smoke.

In some embodiments, one or more nanostructured coatings disposed on one or more of the microparticles can be configured to treat any of gaseous and particulate contaminants.

In some embodiments, one or more nanostructured coatings disposed on one or more of the microparticles can have a thickness in a range of about 1 nm to about 50 nm or any subrange within this range, such as in a range of about 10 nm to about 40 nm, or in a range of about 20 nm to about 30 nm.

In some embodiments, any of the first and the second plurality of nanoscale features can have an aspect ratio in the range of 1 to 100, where the aspect ratio is defined as the length of the feature divided by its average width or diameter.

In some embodiments, a first nanostructured coating disposed on one or more of the microparticles can be at least partially coated with a second coating. In some such embodiments, the second coating can include a plurality of nanoscale features. By way of example, and without limitation, the second coating can include an inorganic material. In some embodiments, the second coating can be configured to enhance any of a catalytic function, a sorption function, and/or a biocidal function of the composition.

In some embodiments, any of the first and the second plurality of nanoscale features includes any of metals, alloys, metal oxides, mixed metal oxides, transition metal oxides, zeolites, oxohydroxides, aluminates, silicates, alumosilicates, titanates, oxo-metallates, vanadia, silica, alumina, titania, zirconia, nickel oxide, ceria, cobalt oxide, copper oxide, iron oxide, tin oxide, manganese oxide, magnesium oxide, noble metal oxides, platinum group metal oxides, molybdenum oxides, tungsten oxides, rhenium oxides, chromium oxides, rare earth oxides, and any combinations thereof.

In some embodiments, the plurality of nanoscale features associated with the microparticles can exhibit a barbed morphology. In some such embodiments, the plurality of the nanoscale features with a barbed morphology can include manganese oxide.

In some embodiments, the microparticles can have a size in a range of about 1 micron to about 50 microns, e.g., in a range of about 3 microns to 7 microns, or 10 microns to about 40 microns, or in a range of about 20 microns to 30 microns.

In some embodiments, the microparticles of the composition can be arranged relative to one another to form a plurality of pores that are characterized by a cross-sectional dimension in a range of about 0.2 to about 25 microns or any subrange within this range, e.g., in a range of about 5 microns to about 20 microns, or in a range of about 10 microns to about 15 microns.

In some embodiments, a composition according to the present teachings can include at least one active material, which can be disposed, e.g., on at least a portion of a plurality of the nanoscale features. By way of example, the active material can exhibit any of a catalytic, a sorption and a biocidal function. Some examples of suitable active materials include, without limitation, a catalytic nanoparticle, zeolite, metal-organic frameworks, an organic material, an inorganic material, and a polymer.

In some embodiments, the active material can be configured to enhance any of a catalytic function, a sorption function, and/or a biocidal function of the composition.

In some embodiments, the hierarchically porous material structure of a composition according to the present teachings can be suitable for treating at least one contaminant. By way of example, the at least one contaminant can be one of a pathogen, a particulate, or a gaseous molecule. The pathogen can include any of a virus, a bacterium or a fungus.

Further, in some embodiments, the composition can include a binder for facilitating agglomeration of the plurality of the microparticles. By way of example, and without limitation, the binder can include a plurality of particles that are disposed between microparticles in one or more pores of the hierarchical porous material structure. In some embodiments, the plurality of binder particles have a size substantially similar to a size of the microparticles pores. In some embodiments, the plurality of binder particles includes a plurality of metal oxide nanoparticles. By way of example, and without limitation, the metal oxide nanoparticles can include any of silica and alumina. In some embodiments, the plurality of the binder particles includes any of a polymeric and a composite material.

A porous material composition according to various embodiments can take a plurality of different geometrical forms. By way of example, in some embodiments, the hierarchically porous material structure can have a substantially spherical shape. Alternatively, in some embodiments, the hierarchically porous material structure can have an irregular shape.

In a related aspect, a filtration system is disclosed, which includes a filter medium, and a granulated filtration material coupled to said filter medium, wherein said granulated filtration material includes an agglomeration of a plurality of microparticles forming a hierarchically porous material structure. In some embodiments, the microparticles of the granulated filtration material can be in the form of porous microparticles. In some embodiments, the filter medium can be configured to remove particulate matter with particle sizes in a range of 0.01 microns to 30 microns from a stream of an incoming fluid (e.g., air) and the granulated filtration material is configured to remove gaseous contaminants from the incoming fluid. Further, in some embodiments, the filter medium can be formed of fiberglass or a polymeric material.

Further understanding of various aspects of the embodiments can be obtained by reference to the following detailed description in conjunction with the associated drawings, which are described briefly below.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings:

FIGS. 6A-6D show SEM images of a porous structure of a filter modified by hierarchically structured microparticles according to some embodiments.

DETAILED DESCRIPTION

Figure 1:
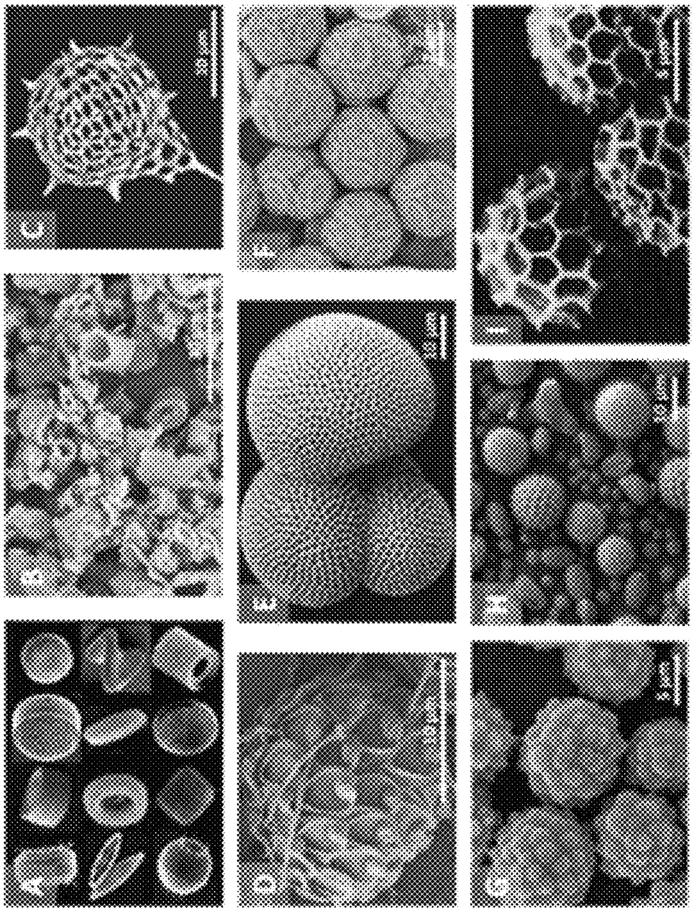
FIG. 1 shows representative Scanning Electron Microscopy (SEM) images of examples of various naturally occurring structured materials that may be used in different embodiments.

Further understanding of various aspects of the present teachings may be found in the following description in conjunction with the associated drawings.

Various embodiments utilize the above-discussed properties of hierarchical structures or surface nanostructures by, for example, utilization of biomineralized particles (e.g., DE) as a substrate or scaffold for depositing or growing prickly nanostructured features.

Compared to synthetic materials, naturally occurring materials, which are, for example, produced by living organisms, may prove superior in the above discussed properties and applications. Their structures are often highly organized at all scales of dimensions from molecular to the nanometer, the micrometer, and to the macro scale, and this organization is usually hierarchical. Moreover, naturally occurring materials may also be relatively inexpensive. Examples of such naturally occurring materials include biominerals originated from single-celled microorganisms such as diatoms, coccolithophores, and radiolarians, which bear rigid cell walls made of silica (diatoms and radiolarians) or calcium carbonate (coccolithophores) with genetically controlled hierarchical nanopatterns.

For example, diatomaceous earth (DE) is a naturally occurring porous biogenic material originated from single-celled algae, called diatoms. DE exhibits intricate 3D porous hierarchical architecture on nano and micro scales. This naturally occurring material is non-toxic and is widely used in commercial applications from agriculture to industrial sectors. It has been applied as wastewater purification filter media, adsorbent, mechanical insecticide, and more. Surface modified DE has found applications in wastewater filtration, sorption and catalysis.

In addition to the structural properties discussed above, a phenomenon that is observed in some natural organisms is the use of surface nanostructures to introduce multiple functions. For example, nano-structure of butterfly's wings provide them with color, mechanical properties, and water repellency. Wings of several species of cicada, dragonfly, and damselfly possess mechano-bactericidal nanopillars that prevent adhesion of pathogens and/or rupture external membranes or walls of the pathogens, thus inactivating them, through a variety of mechanisms.

Some practical applications of the above-discussed properties of hierarchical structures or surface nanostructures have not yet been realized and utilized in the industry. Those applications may utilize the above-discussed properties separately, individually, or in various combinations. Such utilizations, however, have not existed up to now.

In general, various embodiments may utilize different types of naturally occurring microparticles with intricate structures and morphologies. Some of these microparticles may originate from mineral skeletons of zooplankton and plants. Such biominerals, for example, diatom biosilica (aka diatomaceous earth or DE) may be utilized as templates for the synthesis of novel functional materials. In addition, microparticles of organic origins such as spores and pollen may be used as a scaffold/support for further modifications.

FIG. 1 shows representative Scanning Electron Microscopy (SEM) images of examples of various naturally occurring structured materials that may be used in different embodiments. More specifically, FIG. 1 includes nine panels labeled alphabetically from (A) to (I). Panel (A) shows examples of various Diatoms. Panels (B)-(F) and (I) respectively show SEM images of Diatomaceous Earth (DE) (panel (B)), Radiolarian (panel (C)), Silica-scaled Chrysophytes: Mallomonas costata (panel (D)), Foraminifera Globigerina (panel (E)), Coccolithophorid (panel (F)), and Fungal Teliospores Ustilago utriculosa (panel (I)). Moreover, panel (G) shows an SEM image of $SiO_2$ microparticles obtained from pineapple peels, and panel (H) shows an SEM image of a collection of spores and pollen particles from various plants.

DE is one example of naturally occurring porous biogenic materials (BM) utilized in various embodiments. Similarly, some embodiments may utilize other examples of naturally occurring materials that exhibit porous structure or surfaces with prickly and rough morphology. Those examples include organic-based materials such as pollen, spores, inorganic-based BM such as biogenic silica in form of microparticles from pineapple peels, biogenic silica in other marine organisms such as micro-silica spheres from marine sponge (e.g. *Geodia macandrewii*), and biogenic calcium carbonate, also found in various zooplankton and marine sponges (e.g. calcareous sponge). While the remainder of this disclosure describes embodiments that use DE, it should be understood that alternative embodiments may use, instead of or in addition to DE, other types of BM such as those described above.

Surface functionalization of scaffolds of naturally occurring materials (e.g. DE) with nanostructured features broadens their material applications and may create multifunctional hierarchically structured materials with enhanced biocidal, sorption and/or catalytic properties. Introduction of nanostructured coating with prickly surface morphology and/or high surface area simultaneously provide an additional increase in surface area of DE and new surface chemical composition. Such materials, in turn, may be used for further modification to introduce active materials or functional active sites.

Existing applications of BM, including DE, do not utilize some capabilities of the BM at the nano level, which may be enhanced and utilized after modifying the BM. More specifically, some of the embodiments disclosed here utilize modification of the BM, such as DE, with surface bound nanostructured features or nanoscale features with various morphologies. In various embodiments, the nanoscale features may have dimensions in the range of 1 nm to 50 nm. The features may have barbed morphologies at least in some portions. In various embodiments, a nano-feature with a barbed morphology may include a shape such as a cone, a serrated cross section, a tapered cylinder, or a spike for which the base has a size between 1 nm and 10 nm, the height has a size between 1 nm and 50 nm, and the aspect ratio (defined as the ratio of the height to the base) is between 50 and 0.02.

In various embodiments, a modification of the BM may introduce micro and mesoporous coatings with various surface morphologies (nano-roughness), which may include, spikes, flower-like morphology, barbed morphology, needles, pillars etc. In various embodiments, addition of the protrusions may result in an increase in surface area and change in surface chemistry and composition.

In some embodiments, instead of naturally occurring materials, synthetic materials of about the same dimensions may be used as a scaffold or matrix to introduce nanostructured features on their surfaces. Such materials may be referred to as a hierarchically structured material of synthetic origin. When describing functionality or applications, both types of material of either natural or synthetic origin, will be referred simply as hierarchically structured material. More specifically, hierarchically structured materials of natural or synthetic origin may also be referred to as hierarchically structured microparticles or simply hierarchical microparticles.

In some embodiments, specific surface morphology and composition of the surface coating, introduce multiple new functions including mechano-biocidal properties for pathogen inactivation, sorption and catalytic function. In some embodiments, modification of DE surface with structural nanoscopic features enable treatment (e.g., capture, inactivation) of pathogens such as viruses and other pathogenic microorganisms, as well as treatment of gaseous and particulate contaminants.

The combination of hierarchical DE porous structure with nano-rough coating and its composition may provide a synergistic effect for the inactivation of contaminants, such as bacteria, viruses, and other pathogenic organisms.

In many embodiments, the hierarchically structured coating described herein provides the DE with enhanced sorption function due to significant increase in surface area. These properties may be utilized in sorption applications including carbon sequestration, carbon dioxide capture and storage, carbon dioxide capture and storage and conversion through incorporation of high surface area materials (e.g. MOFs) and catalyst.

Such materials may find many applications including air and water purification and decontamination, sorption, catalysis, filter renewal, sensors.

In particular, hierarchically structured materials with modified surface morphology and composition may be applied to porous macroscopic substrates to create hierarchically porous functional materials with enhanced properties toward air purification and decontamination.

The air purification and decontamination systems according to some embodiments of the present teachings include hierarchical material structures featuring micron-scale pores and counter-pathogenic nanoscale surface features for a multi-pronged biocidal solution. In some implementations of such systems, the porous surfaces having large surface areas may efficiently trap pathogens while surface nanostructures on the porous surfaces may rupture or incise the external membranes or walls of a wide variety of pathogens.

Figure 2:
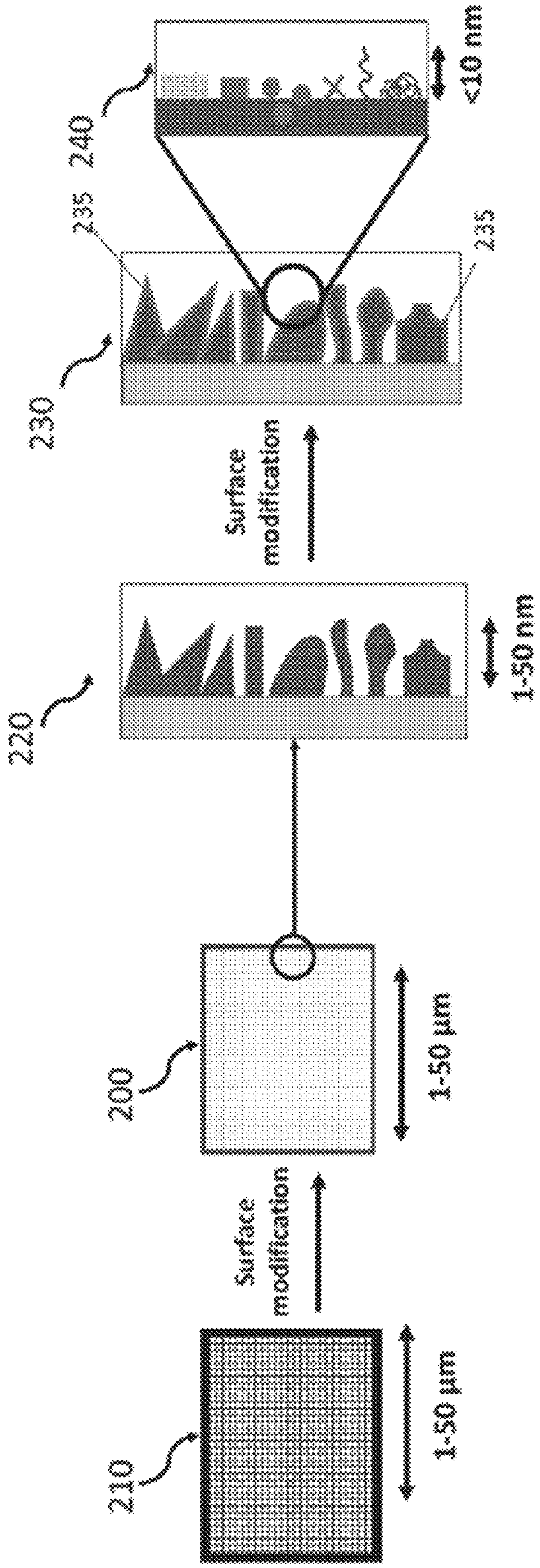
FIG. 2 illustrates the hierarchical structure of a hierarchical material according to some embodiments.

FIG. 2 illustrates the hierarchical structure of a hierarchical material according to some embodiments. More specifically, FIG. 2 includes illustrations of a hierarchical material 200, microparticle 210, a first nanoscale-feature-set 220, a surface-modified feature-set 230, and a second nanoscale-feature-set 240. Microparticle 210 may be a natural microparticle such as DE or a synthetic microparticle. FIG. 2 illustrates generation of hierarchical material 200 from microparticle 210 through surface modification.

The representative dimension of the hierarchical microparticles may be in a range of about 1 micron to about 50 microns, e.g., in a range of about 5 microns to about 45 microns, or in a range of about 10 microns to about 40 microns, or in a range of about 15 microns to about 35 microns, or in a range of about 20 microns to about 30 microns.

The illustration shows different levels of the hierarchy for hierarchical material 200. Starting from microparticle 210, a first level of nanostructure is generated by adding first nanoscale-feature-set 220 to portions or all of the surface of microparticle 210. Then, a second set of features is generated by adding second nanoscale-feature-set 240 to portions or all of the surface of first nanoscale-feature-set 220, shown as an extra layer 235 in surface-modified feature-set 230.

In some embodiments, microparticle 210 may be a naturally occurring material that may be modified to produce hierarchical material 200 with a plurality of nanoscale features, such as those shown in first nanoscale-feature-set 220. The shape, size, and internal structure of these microparticles may depend on the type of naturally occurring material some of examples of which were described in relation to FIG. 1. The plurality of nanoscale features may exist on the surface of a microparticle creating nanostructured coating.

The first nanoscale feature set may enable functions such as sorption function, biocidal, or catalytic function.

The first nanoscale feature set may be further modified to include additional features with additional functionalities. The additional features may include features such as those shown in second nanoscale-feature-set 240. The additional functionalities introduced by second nanoscale-feature-set 240 may include functions such as sorption function, biocidal, or catalytic function.

In some embodiments, the modification of the microparticle surface with a plurality of nanoscale features sets create nanostructured coating.

In some embodiments, the nanostructured coating may form a continuous film/coating on the surface of microparticles. In other embodiments, the nanostructured coating may form discontinuous coating, or discrete segments of the coating.

In some embodiments, the first nanoscale-feature-set 220 may enable sensing function.

In some embodiments, the second nanoscale-feature-set 240 may enable sensing function.

In some embodiments, the combination of both nanoscale feature sets 220 and 240 may enable sensing function.

In some embodiments, the nanostructured coating may have a sensing function.

In some embodiments first nanoscale-feature-set 220 or second nanoscale-feature-set 240 may be formed directly on the surface of microparticle via wet chemical modification in which microparticles of natural or synthetic origin are reacted/chemically treated with nanoscale-forming (NFF) precursors.

In some embodiments the surface of microparticle may be treated with pre-formed nanoscale features.

In some embodiments, the pre-formed nano-features may be attached to the surface of microparticle via covalent bonding, ionic bonding, van der Waals bonding and combination thereof.

In some embodiments, the nanostructured coating may have micro-porosity, meso-porosity, or a combination of both. The nanostructured coating may have various surface morphologies (nanoscale features) such as spikes, flower-like morphology, barbed morphology, needles, pillars etc. Regardless of the specific shape, these extrusions may result in significant increase in surface area and change in surface chemistry and/or composition.

In some embodiments, the hierarchically structured materials may have air purification and decontamination functions. This function may include treatment of various air pollutants including particulate matter, gaseous pollutants and pathogens.

In some embodiments, the air contaminants may become a stimuli or analytes when the hierarchically structured material is used for sensing applications.

By way of example, the nanoscale features may include any of oxides, mixed oxides, transition metal oxides, zeolites, hydroxyapatite, oxohydroxides, aluminates, silicates, aluminosilicates, titanates, oxo-metallates, vanadia, silica, alumina, titania, zirconia, nickel oxide, copper oxides, ceria, cobalt oxide, tin oxide, manganese oxide, magnesium oxide, noble metal oxides, platinum group metal oxides, molybdenum oxides, tungsten oxides, rhenium oxides, chromium oxides, rare earth oxides, and any combinations thereof.

In some embodiments, the nanoscale features may include transition metal chalcogenides, such as molybdenum disulfide (MoS2), titanium disulfide (TiS2), tungsten disulfide (WS2), TaS2, ZrS2, WSe2, Sb2Se3, NbSe2, and Bi2Te3.

In some embodiments, the nanoscale features may include layered double hydroxides, such as natural hydrotalcite (Mg6Al2(OH)16CO3×4H2O), silicate clays, boron nitrides, transition metal carbides and nitrides (also referred to as MXenes).

In some embodiments, the nanoscale features may include graphene-based materials, such as graphene oxides.

By way of example, the nanoscale features may include various manganese oxides and Mn oxides hydroxides with different valence states of Mn including MnO(OH), MnO, $MnO_2$, $Mn_2O_3$, $Mn_3O_2$ and their mixtures.

In some embodiments, the surface nanostructures in first nanoscale-feature-set 220 may be further modified to form surface-modified feature-set 230 in order to enhance or add the functionality such as sorption function, biocidal or catalytic function.

In some embodiments, the sorption function may include $CO_2$ sorption and storage.

In some embodiments, one or more active materials may be disposed on the surface of at least some of the nanostructures in first nanoscale-feature-set 220. The active materials may exhibit photocatalytic function, photothermal catalytic function, photoelectrocatalytic function, or the like, depending on the application requirements. The active materials may include one or more active cites thereon.

In some embodiments, the active materials may include catalytic nanoparticles.

In some embodiments, the catalytic nanoparticles include nanoparticles made of metal oxides, mixed metal oxides, or metal sulfide nanoparticles; some particular examples include copper oxide, alumina, titania, zirconia, nickel oxide, cobalt oxide, tin oxide, manganese oxide, magnesium oxide, noble metal oxides, platinum group metal oxides, tungsten oxides, chromium oxides, or a combination thereof.

In some embodiments, the catalytic nanoparticles include metal nanoparticles, such as gold, silver, platinum, palladium, ruthenium, rhodium, cobalt, iron, nickel, copper, chromium, tungsten, molybdenum, vanadium, titanium, zirconium, bimetals, metal alloys, metal compounds, such as pnictides, hydroxides, binary and complex salts or a combination thereof.

In some embodiments, the modification may include a chemical functionality on the surface of nanostructured features.

In some embodiments, the functionalities may include, without limitation, organic materials, inorganic materials or a combination thereof. Some examples of such materials include, without limitation, amine, thiol, aluminum hydroxide, various quaternary ammonium salts like hexadecyltrimethyl-ammonium bromide, other types of surfactant or enzymes.

In some embodiments, the nanoscale features may be further coated with inorganic materials such as metal, metal oxides such as silver, copper oxide, manganese oxide, silica, zeolites, and activated carbon.

In some embodiments, the nanoscale features may be further coated with metal organic frameworks (MOFs).

In some embodiments, the active material may include polymeric materials.

In some embodiments, the active material may include organometallic complexes.

In some embodiments, both the nanoscale features and the active material may have similar compositions but a different morphology. In some other embodiments, the nanoscale features and the active material may have different compositions.

In some embodiments, the active material may be attached via covalent bonding, ionic bonding, van der Waals bonding and combination of thereof.

In some embodiments, the functionalization of nanoscale features with an active material may be introduced through wet chemical modification, infiltration, physical vapor deposition, atomic deposition, evaporation, sputtering, ion impregnation, and any combination thereof.

In some embodiments, the scaffold of hierarchical material may have synthetic origin and may be modified with nanostructured features in the same manner as a scaffold of a naturally occurring material, e.g., using the techniques of the present embodiments.

Figure 3:
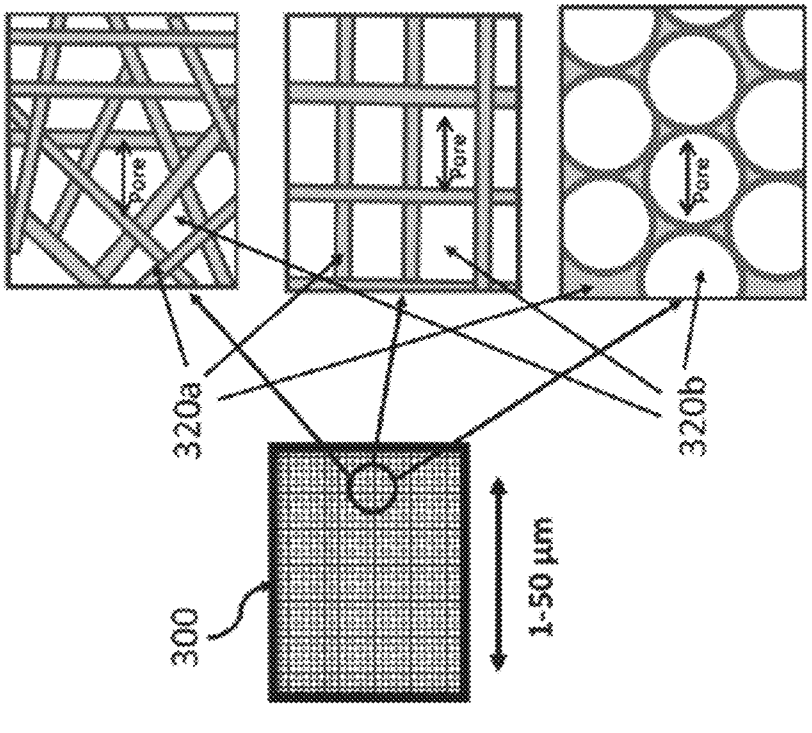
FIG. 3 illustrates various examples of internal structure of a hierarchically structured synthetic material 300 according to some embodiments.

FIG. 3 illustrates various examples of internal structure of a hierarchically structured synthetic material 300 according to some embodiments. Hierarchically structured material 300 may include a matrix 320 formed by a number of intersecting elements **320*a* patterned to provide a number of interconnected pores 320*b***.

In some embodiments, interconnected pores **320*b* of hierarchical material 300 may exhibit a cross-sectional dimension in a range of about 50 nm to about 10 microns, e.g., in a range of about 100 nm to about 5 microns, or in a range of about 500 nm to about 1 micron. In some embodiments, interconnected pores 320*b* of the hierarchical material 300** may exhibit a surface area to weight ratio (specific surface area, SSA) in the range of about 10 $m^2/g$ to about 1,000 $m^2/g$, or in a range of about 100 $m^2/g$ to about 500 $m^2/g$.

In some embodiments, the hierarchical microparticle may have a single type of porosity including microporous, mesoporous, or macroporous. In some embodiments, the microparticle may have multiple porosities, i.e. exhibits a hierarchical porosity.

In some embodiments, both the nanoscale features and the matrix may have similar compositions but a different morphology. In some other embodiments, the nanoscale features and the matrix may have different compositions.

By way of example, the matrix may include any of oxides, mixed oxides, mixed oxides of elements from one or more groups I, II, III, IV V, VI, zeolites, oxohydroxides, aluminates, silicates, alumosilicates, titanates, oxometallates, metal-organic frameworks, vanadia, silica, alumina, titania, zirconia, hafnia, nickel oxide, cobalt oxide, cobalt oxide, tin oxide, manganese oxide, magnesium oxide, noble metal oxides, platinum group metal oxides, molybdenum oxides, tungsten oxides, rhenium oxides, tantalum oxide, niobium oxide, chromium oxides, scandium, yttrium, lanthanum, thorium, rare earth oxides, and any combinations thereof.

In some embodiments, the matrix may include any of a synthetic polymer, a natural polymer, a biopolymer, and any combinations thereof.

In some embodiments, the interconnected pores of the hierarchical material may include one or more channels having a variety of geometrical shapes and may be arranged relative to one another in a variety of different patterns. For example, at least one of the channels may have a substantially linear or an arcuate shape. Further, in some embodiments, one or more of the channels may be parallel to one another, or may be intersecting so as to provide a pattern of interconnected channels.

In some embodiments, the hierarchical material may be in the form of spray dried particles.

In some embodiments, the hierarchically structured materials described above may have microporosity, meso-porosity, microporosity, or have hierarchical (e.g. bi-modal) porosity.

Figure 4A:
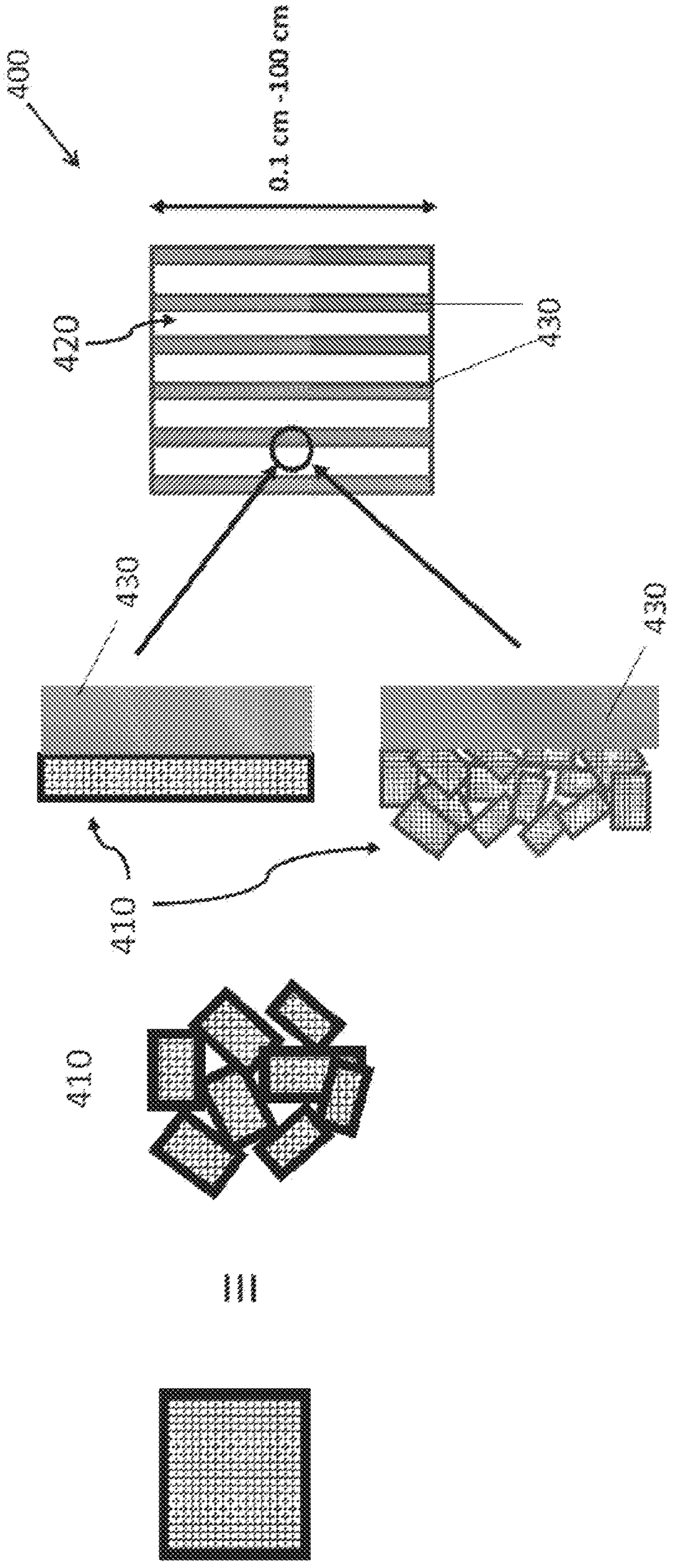
FIG. 4A shows macroscopic porous substrates 400 and a plurality of hierarchically structured particles 410 according to some embodiments.
Figure 4B:
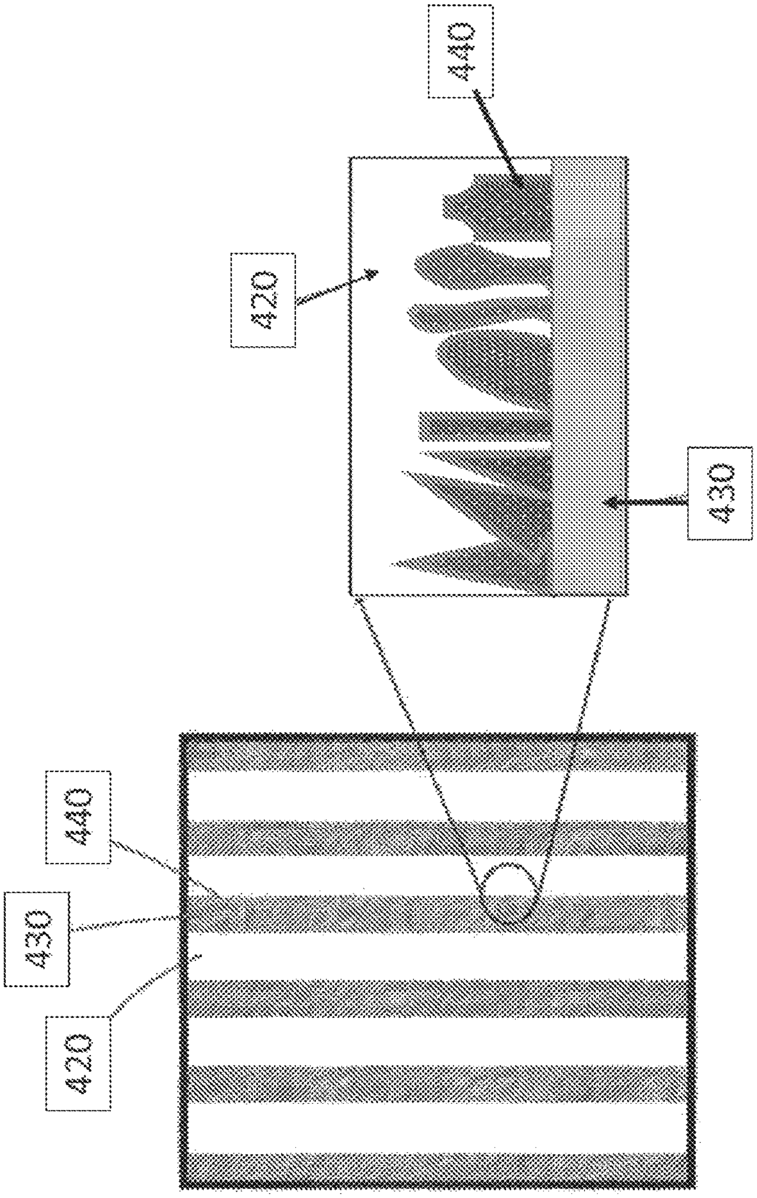
FIGS. 4B and 4C illustrate applications of nano-features on macroscopic porous substrates according to some embodiments.
Figure 4C:
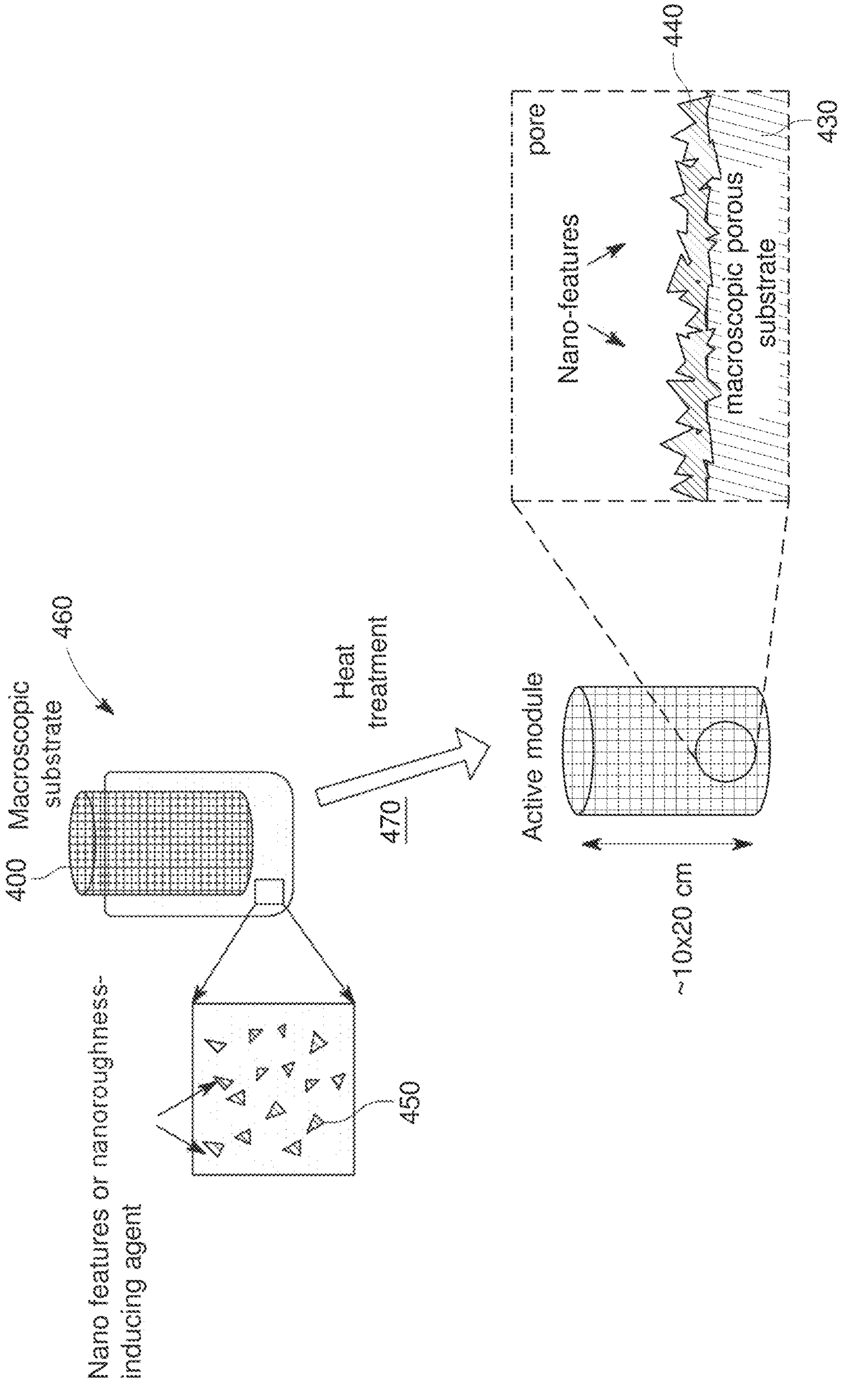

FIG. 4A shows macroscopic porous substrates 400 and a plurality of hierarchically structured particles 410 according to some embodiments. FIGS. 4B and 4C illustrate applications of nano-features on macroscopic porous substrates according to some embodiments.

Macroscopic substrate 400 includes a plurality of walls 430 separated by channels 420. Moreover, hierarchically structured particles 410 have been applied on some parts or all of the surfaces of one or more of walls 430 of macroscopic substrate 400 as a coating.

In some embodiments, channels 420 exhibit a length in a range of about 1 mm to about 1 m, e.g., in a range of about 10 mm to about 0.1 m. Channels 420 may have a variety of geometrical shapes and may be arranged relative to one another according to a variety of different patterns. For example, at least one of the channels 420 may have a substantially linear or an arcuate shape. Further, in some embodiments, one or more of the channels 420 may be parallel to one another or may be intersecting so as to provide a pattern of interconnected channels. In some embodiments, a combination of parallel and intersecting channels may be employed.

In some embodiments, the macroscopic porous substrate may have pore sizes in a range of about 100 nm to about 5 mm, e.g., in a range of about 400 nm to about 3 mm, or in a range of about 600 nm to about 1 mm, or in a range of about 800 nm to about 0.8 mm, or in a range of about 1,000 nm to about 500 microns, or in a range of about 2,000 nm to about 200 microns, or in a range of about 2,500 nm to 100 microns. In the context of present disclosure, the average pore size refers to, e.g., the pore diameter or a cross sectional dimension (e.g., the largest or the average cross-sectional dimension), e.g., in the case of a high aspect ratio pore (where the ratio between the long and the short dimensions of a pore is greater than 1.5).

In some embodiments, the hierarchically structured microparticles may include hierarchical materials of natural origin or hierarchical material made of synthetic scaffold. In some embodiments, the combination of both types of materials may be applied as a coating on the macroscopic substrate.

In some embodiments, for example, those of FIGS. 4B and 4C, nanoscale features 440 may be disposed directly on the surfaces of the macroscopic porous substrate. In particular, nanoscale features 440 may be directly disposed on the surfaces of walls 430 at the interface between macroscopic porous substrate 400 and the pores or channels 420.

Referring to FIG. 4C, in some embodiments the surfaces of the macroscopic porous substrate may be chemically modified via surface treatment. For example, the surface treatment may include dipping the macroscopic porous substrate in a solution that contains nanoscale-forming (NFF) precursors 450 (step 460), followed by a heat treatment (step 470). As a result, NFF 450 may form the plurality of nanoscale features that exhibit nano-roughness on the macroscopic porous substrate. In some embodiments, such NFF precursors may be considered nano-roughness forming (NRF) precursors.

In some embodiments, the NFF precursors may include a complex salt of at least one of an alkali metal, an alkali-earth metal, a group (III) metal, and a transition metal salt. In some embodiments, the NRF precursors may include a salt with thio and seleno anions and metal cation ($[PPh4]+$ and $[NEt4]+$), such as ammonium tetrathiomolybdate, ammonium tetrathiovanadate, piperidinium tetrathiotungstate, and tetraethylammonium tetraselenotungstate. In some embodiments, the NRF precursors may include potassium permanganate (KMnO4), Manganese sulfate, or Manganese (II) chloride (MnCl2).

In certain embodiments, the NFF precursors may be in the form of a sol-gel precursor, a nano-particulate precursor, or any combinations thereof. In some such embodiments, the sol-gel matrix precursor material may include a silica, alumina, titania, or ceria and/or zirconia sol-gel, and the nano-particulate precursor may include a single or a mixture of nanoparticles of the matrix materials described above.

In some embodiments, the NFF precursors may include graphite materials.

In some embodiments, binders may be added to improve adhesion and mechanical robustness of the coating of hierarchical microparticles to the surfaces of walls 430 of the macroscopic substrate. By way of example, the binders may include metal oxide nanoparticles, e.g., silica or alumina. In some embodiments, the size of the binder particles may be substantially similar to or larger than the pores on the surface of the particles 410. In some embodiments, the coating may exhibit a thickness in a range of about 1 micron to about 200 microns, or in a range of about 10 microns to about 100 microns. In some embodiments, the coating may be formed as a continuous film. In other embodiments, the coating may be formed as a plurality of discontinuous segments.

In other embodiments, the coating includes a discontinuous coating, i.e., a coating having a plurality of disjointed segments, or may completely fill the pores of the macroscopic substrate. In other embodiments, the coating may include a collection of discrete hierarchically structured microparticles including a plurality of materials islands, clusters, or aggregates.

In certain embodiments, the macroscopic porous substrate may be fabricated from a ceramic material, such as cordierite, Mullite, zeolite, and natural or synthetic clay. In certain embodiments, the macroscopic porous substrate may be made from one or more metals and/or metal alloys, such as stainless steel, ferritic steel (e.g., an iron-chromium alloy), austenitic steel (e.g., a chromium-nickel alloy), copper, nickel, brass, gold, silver, titanium, tungsten, aluminum, palladium, platinum, and any combinations thereof.

In some embodiments, the macroscopic porous substrate may be implemented as a particulate filter.

In certain embodiments, the macroscopic porous substrate may be made from a polymer, such as polyurethane, polystyrene, poly(methyl methacrylate), polyacrylate, poly(alkyl acrylate), substituted polyalkylacrylate, polystyrene, poly (divinylbenzene), polyvinylpyrrolidone, poly(vinylalcohol), polyacrylamide, poly(ethylene oxide), polyvinyl chloride, polyvinylidene fluoride, polytetrafluoroethylene, other halogenated polymers, hydrogels, organogels, and any combinations thereof. Other polymers having different architectures may be utilized as well, such as random and block copolymers, branched, star and dendritic polymers, and supramolecular polymers.

In certain embodiments, the macroscopic porous substrate may be fabricated from fiberglass. In certain embodiments, the macroscopic porous substrate may be made from one or more natural materials, such as cellulose, natural rubber (e.g. latex), wool, cotton, silk, linen, hemp, flax, feather fiber, and any combinations thereof. In certain embodiments, the macroscopic porous substrate may be made from natural or synthetic fabrics and textiles, and any combinations thereof.

In some embodiments, the macroscopic porous substrate may be a filter.

In some embodiments, the porous structure of a filter according to the present teachings may include non-woven fibrous media where fibers are layered into a web that is then bound together by bonding via chemical, mechanical, heat or solvent treatment, and/or by the interlocking of fibers.

In some embodiments, the structure of a filter according to the present teachings may be made of woven fibrous media where fibers overlap one another.

In some embodiments, the structure of the filter may be made of, include, or be coated with any of fiberglass, polymer fibers, natural fibers such as cotton, other synthetic materials such as cellulose acetate, cellulose nitrate (collodion), polyamide (nylon), polycarbonate, polypropylene, polytetrafluoroethylene, stainless steel, nickel alloy, Inconel, FeCrAlY alloy, or a combination thereof.

In some embodiments, the filter may be made of, include, or be coated with any of a polymer, such as polyurethane, and/or comprises at least one of: polystyrene, poly(methyl methacrylate), polyacrylate, polyalkylacrylate, poly(divinylbenzene), polyvinylpyrrolidone, poly(vinyl alcohol), polyacrylamide, poly(ethylene oxide), polyvinyl chloride, polyvinylidene fluoride, polytetrafluoroethylene, other halogenated polymers, hydrogels, organogels, chitin, and chitosan.

By way of example, hierarchically structured microparticles of natural or synthetic origin 220 may be applied on macroscopic porous substrate prior to their modification.

In certain embodiments, the nanoscale features 440 may be formed of any of oxides, mixed oxides, transition metal oxides, zeolites, oxohydroxides, aluminates, silicates, alumosilicates, titanates, oxo-metallates, vanadia, silica, alumina, titania, zirconia, nickel oxide, cobalt oxide, tin oxide, manganese oxide, magnesium oxide, noble metal oxides, platinum group metal oxides, molybdenum oxides, tungsten oxides, rhenium oxides, chromium oxides, rare earth oxides, and any combinations thereof.

By way of example, the nanoscale features 440 may be formed of MoS2 or manganese oxides.

By way of example, the nanoscale features may have the structures and compositions described above.

In many embodiments, the compositions and materials disclosed herein offer a multi-pronged mechanism for treatment of pathogens and other particles such as ultrafine particulate matter (PM) or PM0.1-1. As described below, in some embodiments, this goal may be achieved via rational design of a structure that includes a porous macroscopic substrate and a hierarchically structured coating that is deposited on the internal surfaces of at least some of the pores of the macroscopic porous substrate. Both the porous substrate and the coating may include nano-features. In some such embodiments, the structure may include hierarchical porosities ranging from micron sized pores of the substrate to micro, meso and/or macro-porous structure of the coating.

Term "contaminants" and "pollutants" are herein used interchangeably to refer to a variety of inorganic, organic, and mixed inorganic and organic material structures, including naturally-occurring and artificial material structures, such as a variety of microorganisms (e.g., bacteria and/or viruses), and smoke or other types of particulates. Contaminants may encompass particulates of organic, inorganic and mixed origin, aerosols including bioaerosols, and gaseous contaminants such as VOCs. In general, contaminants may include different types of particulates or organisms that may accumulate in the filter during its use and deteriorate the performance of the filter. The deterioration may include a reduction in the rate at which the filter may purify the air, or the quantity or type of the contaminants that the filter may capture in a unit of time.

Many embodiments of the present teachings provide material structures that possess unique properties applicable, for example, to antiviral and antimicrobial air purification. In some embodiments, the material structures may be applied for antiviral and antimicrobial liquid purification.

More specifically, the material integrates a hierarchical structure having various length scales, each rationally tuned for a multi-pronged approach to pathogen entrapment and elimination, which relies on micron-scale pores for entrapment of pathogens and other particulates, and nanoscale features (e.g., roughness, sharp edges, knife-edge features, wrinkles, or the like) of the pore-matrix interface for destruction of pathogens. For tuning of the hierarchical structure, the size of the micron-scale pores may be designed to increase the entrapment efficiency of the target pathogens, and the size of the nanoscale features may be designed to more efficiently destroy the pathogens. Accordingly, the features may be designed in length scales commensurate with the relevant target pathogen dimensions.

In some embodiments, the hierarchical material disclosed herein may be used in the form of coatings, such as coatings with rough surfaces, that are deposited on macroscopic porous substrates.

In some embodiments, the hierarchical material disclosed herein may be used in the form of coatings on flat surfaces.

The hierarchical materials according to embodiments of the present teachings may be configured to treat at least a portion of one or more types of pathogenic organisms, if any, present in a flowing medium. In some embodiments, the hierarchical material may include a macroscopic porous substrate, a coating, and optionally active sites configured to treat at least one type of pathogen present in the flowing medium. In many embodiments, the flowing medium may be any of gas or liquid. By way of example, the flowing medium may be air or water. In some embodiments, the flowing medium may be an aqueous medium. In some embodiments, the flowing medium may be a bodily fluid (e.g., blood).

The pathogenic organisms may include any of a virus, a bacterium, and fungi.

In some embodiments, specific surface morphology and composition of the coating, introduce multiple new functions including mechano-biocidal properties for pathogen inactivation, sorption and catalytic function. In some aspects, the present disclosure relates to modification of microparticle surfaces (e.g. DE) with structural microscopic and nanoscopic features that are designed to efficiently treat (e.g., capture, inactivate) viruses and other pathogenic microorganisms, as well as treat gaseous and particulate contaminants.

A modified particle according to the present teachings may also be effectively employed for treating contaminants present in a liquid medium, e.g., water.

The use of surface nanostructures to mechanically damage external membranes or walls of the pathogens, thus inactivating them, is a common motif observed throughout the natural world. For example, wings of several species of cicadas, dragonflies, and damselflies possess mechano-bactericidal nanopillars. The mechanisms of action are diverse. For example, the surface roughness may modify the contact angle compared to a flat surface, may prevent adhesion of the pathogens, or may provide sharp points or edges in length scales commensurate with the relevant pathogen dimensions. Synthetic systems with biocidal effects have been demonstrated in various forms, including nanopillars and nanosheets (also known as "nano-knives'). For example, the graphite family (e.g., graphite, graphene oxide (GO)) has been well-studied for antibacterial applications. Researchers have reported that sharp edges of GO damage bacterial membranes, resulting in the release of cytoplasmic materials and bacteria death. Other studies demonstrated that graphite surfaces modified with vertically aligned MnO2 and MoS2 nanostructures possess high antibacterial efficacy. These studies have been constrained to liquid state applications. Furthermore, their material choices, methods, and volume requirements limit the commercial viability of the technologies.

In some embodiments, the modification of DE surface with counter-pathogenic nanoscale roughness will result in hierarchical material structures featuring micron-scale pores and nanoscale surface features for a multi-pronged biocidal solution. In some implementations of such material, the porous surfaces having large surface areas may efficiently trap pathogens while the nano-knives on the porous surfaces may rupture or incise the external membranes or walls of a wide variety of pathogens.

In some embodiments, the biocidal properties may be adjusted through synergy between surface morphology and chemical composition of the coating, for example, using materials (e.g. metal oxides of Mn, Ce, Ca) that may chemically damage the pathogen through generation of reactive oxygen species (ROS).

In some embodiments, surface modified DE may have improved sorption and filtration functions due to increased surface area and specifically designed coating composition. The most frequently used materials for the capture of gaseous contaminants are porous substances with large surface area and pore volume such as activated carbon, zeolites, metal oxides and their derivatives. In various embodiments, combining sorption function with nanostructuration in design of sorbent materials on macroporous support prevents its compaction and back pressure increase, while preserving its high surface area. Surface modification of DE could improve the overall sorption capacity through grafting and nanostructuration of common VOC sorbent materials.

By way of example, the magnitude of specific surface area (SSA) here is evaluated in relative terms, that is SSA is considered to be enhanced if the initial material has lower surface area than structured material of the same material after modification. For example, a sand grain which has a similar composition ($SiO_2$) to DE, has a SSA of 0.1 m2/g. The SSA of DE may vary between 10 to 40 m2/g due to the porosity and structure. In a specific example provided here, the SSA of DE was measured to be ~30 m2/g. After modification with certain MnO structures, the SSA is increased to ~45 m2/g. Activated carbon is known to have SSA in the range of 700-1000 m2/g and MOFs in the range of 5000-7000 m2/g. Subsequent modifications using high surface area materials may increase the SSA further.

In some embodiments, the surface area may be significantly increased after modification with metal organic frameworks (MOFs).

In some embodiments, the catalytic function may be introduced through incorporation of catalytic nanoparticles after first or second modifications.

In some embodiments, the nanostructured coating may provide catalytic function. The catalytic function may be introduced through incorporation of catalytic particles into the coating or through nanostructuration of the coating itself. For example, many metal oxide exhibit high catalytic activity for different oxidation and reduction reactions due to morphological nano characteristics.

As discussed in more detail below, the combination of the structure of micron-scale pores of the hierarchical material with the structure and composition of the pore surface may provide a synergistic effect for the inactivation of contaminants, such as bacteria, viruses, and other pathogenic organisms.

In some embodiments, the surface morphology and porosity of the hierarchical material at the nano- and micro-levels may be tuned to facilitate entrapment of viruses and bacteria and to inflict mechanical damage to viral envelope and/or capsid and bacterial membranes to achieve a designed biocidal function. In this regard, the surface morphology may be tuned by adjusting the material composition and/or by adjusting the fabrication process conditions such as the concentration of precursor materials and process temperature.

In some embodiments, the nanoscale features may exhibit a geometry, an aspect ratio and/or a size configured to facilitate causing mechanical damage to the pathogens. For example, the representative dimension of the nanoscale features may be in a range of about 3 nm to about 30 nm, e.g., in a range of about 10 nm to about 20 nm.

In some embodiments, a coating applied to the substrate may facilitate/enhance a particular filtration function. The particular filtration function may include one or more inactivation of pathogens, decomposition of organic and gaseous contaminants, and sorption (both adsorption and absorption). The sorption may include sorption of gasses (e.g., VOCs, CO2, CO, ammonia and its derivatives), contaminant matter, or microorganisms (e.g., pathogens, such as bacteria, viruses, etc.).

In some embodiments, such enhanced sorption and/or decomposition properties may be due to the presence of an active material on the surface of hierarchically structured microparticles.

In some embodiments, the modification of the substrate with hierarchically structured coating according to the present teachings may result in a functional substrate that may exhibit both sorption and catalytic activity. For example, in some embodiments, the coating may include one or more metal oxides with surface properties designed with increased affinity toward certain contaminants (hydroxylated surface or surface with amine functions to improve the adsorption of polar molecule such as formaldehyde or alcohol or hydrophilic particle) and elemental composition with catalytic activity toward treatment of contaminants (e.g., nickel oxide, palladium oxide, mixed metal oxides).

In some embodiments, a combination of the macroscopic substrate, the coating that includes hierarchically structured particles of synthetic or natural origin, and optionally the active sites/reactive material are configured to treat at least a portion of one or more types of particulates, if any, present in the flowing medium. By way of example, in some embodiments, the size range of the particulates that may be treated is about 1 nm to about 1 micron. In some embodiments, the size range of the particulates to be treated may be in a range of about 5 nm to about 5 microns, or in a range of about 10 nm to about 1 micron, or in a range of about 100 nm to about 500 nm. This may be done by tuning a number of parameters of the coated substrate (e.g., the porosity of the substrate, sizes of the particles and their modification). The arestance or filtration of pollutants may be determined or adjusted by particle sizes. A modified substrate in accordance with some embodiments may be configured to filter (e.g., inactivate, remove) particulates with a size in a range of about 5 nm to about 5 microns, or in a range of about 10 nm to about 1 micron, or in a range of about 100 nm to about 500 nm.

In many embodiments, the compositions and materials disclosed herein offer a versatile mechanism for treatment of pathogens and other particles such as ultrafine particulate matter (PM) or PM0.1-1 as well as gaseous and liquid contaminants. This goal may be achieved through fabrication of composite DE structures consisting of DE as a macroscopic porous substrate and a nanostructured coating with rational designed morphology and composition that is deposited on the surfaces of at least some of the pores of DE. The nanostructures composition and morphology may facilitate/enhance a particular function such as inactivation of pathogens (e.g. such as bacteria, viruses, etc.), decomposition of organic and gaseous contaminants, and sorption (both adsorption and absorption) including sorption of gasses (e.g. VOCs, CO2, CO, ammonia and its derivatives).

In some embodiments, the present disclosure provides a filter having a porous structure (herein also referred to as a primary architecture) modified/coated with hierarchically structured particles to capture at least part of contaminants. The porous structure is herein also referred to as the bare filter, as the porous structure provides filtration functionality even in the absence of the coating. In embodiments, the hierarchically structured particles provide a coating that allows renewal of the filter.

In many embodiments, the inclusion of a coating with hierarchically structured microparticles with or without active material on one or more interior surfaces of the filter without blocking the passages or pores may provide a functionalized filter that operates effectively with a relatively small increase in back pressure after coating. In other words, a functionalized filter may treat at least some contaminants (e.g., pathogens such as viruses, particulate matter, or gaseous contaminants) in the air, without significantly restricting the passage of air through the system. In this regard, the back pressure of a functionalized filter for a desired range of air flow rate may remain within an acceptable range, e.g., within about 50× of the back pressure of the uncoated filter under similar flow conditions (e.g., in the range of 0.1 to 10000 CFM, or 0.5 to 1000 CFM, or 1 to 500 CFM).

By way of example, the incremental back pressure may be within about 50×, or about 40×, or about 30×, or about 20×, or about 10×, or less.

The phrase "renewal of a filter" as used herein means the process of improving the filtration functionality of the filter after the functionality has deteriorated due to being used for a period of time. The deterioration of filtration functionality may result, for example, from accumulation of contaminants in the filter. The renewal of the filter may include, for example, removing some or all of the accumulated contaminants from the filter. The renewal of the filter may include bringing the state of the filter substantially back to a state in which the filter is capable of performing its intended filtration function.

In some embodiments, the renewal of the filtration functionality of a filter according to the present teachings may be achieved by supplying energy to intermittently treat the filter, and in particular its coating, so as to allow the filter to provide pathogen inactivation and at least partial decomposition and removal of arrested contaminants. By way of example, the renewal of the filter may be achieved via heating the filter, exposing the filter to light, exposing the filter to a magnetic field, etc. at certain time intervals and/or based on environmental triggering. For example, in some embodiments, a filter according to the present teachings with a coating may be heated to a temperature greater than about 90° C. for inactivation of at least a portion of pathogens captured by the filter. In other embodiments, a filter according to the present teachings with a DE coating may be heated to a temperature in the range of 90° C. to 200° C.

By way of example, the renewal of a filter may be initiated due to some trigger, such as an environmental triggering. In various embodiments, the environmental triggering for the initiation of filter renewal may be based on the detection of some change in an environmental factor or for an environmental factor to reach a threshold value. For example, the environmental triggering may correspond to a sudden increase or an increase above a threshold value in the concentration of contaminants in the ambient air, in an internal temperature, in the back pressure, and/or in an internal pressure of the filter.

Figure 5:
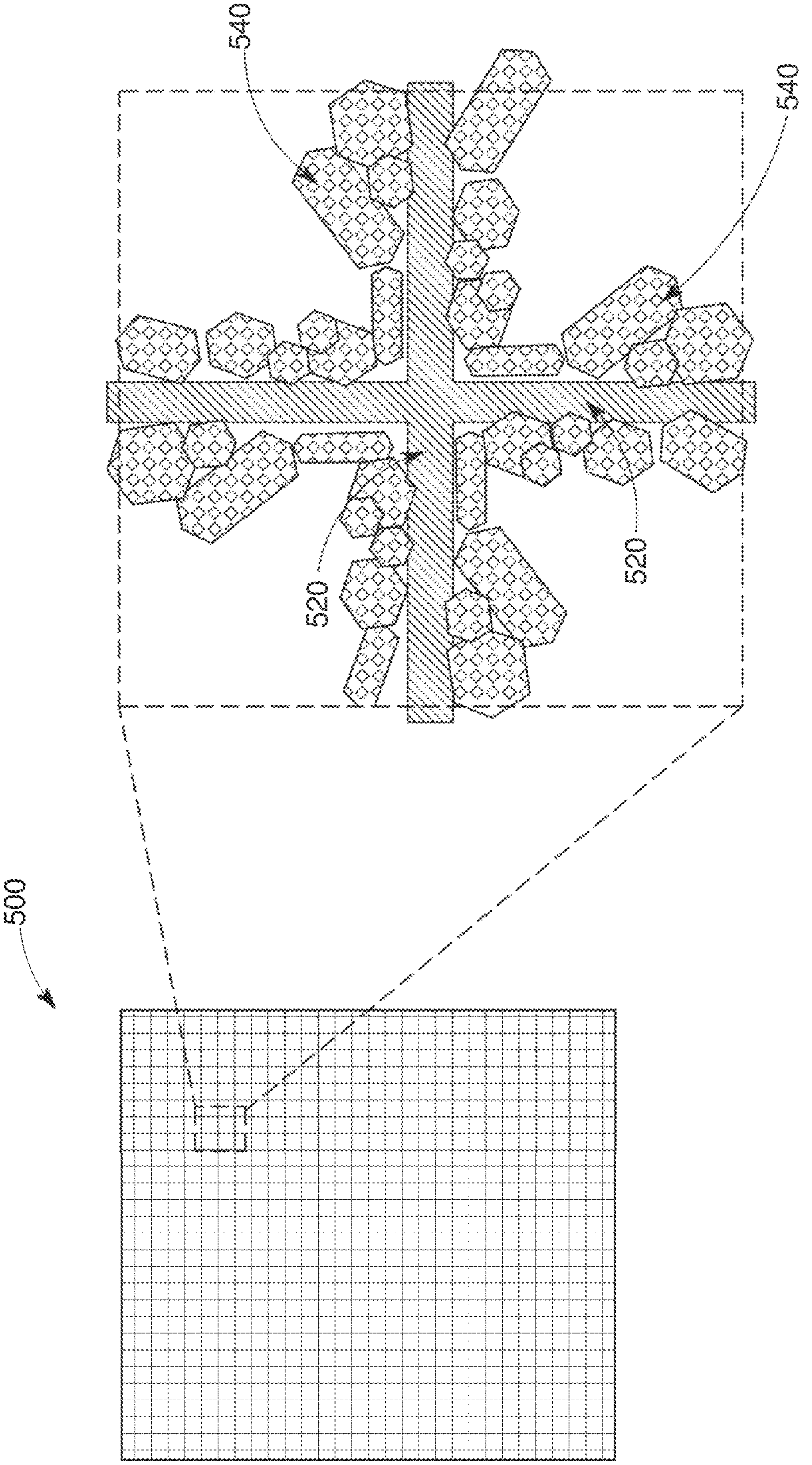
FIG. 5 illustrates an example of a filter 500 according to some embodiments.

FIG. 5 illustrates an example of a filter 500 according to some embodiments. Filter 500 includes a porous structure 520 and hierarchically structured microparticles 540 that is coupled to the porous structure. In this embodiment, the porous structure is formed of a plurality of crisscrossing fibers with empty spaces between them in at least some of which the hierarchically structured microparticles 540 are disposed. While in some embodiments the hierarchically structured particles 540 fills substantially the entire empty space between the crisscrossing fibers, in other embodiments only a portion of the empty space is filled with particles 540. An amount of empty space that may be filled with particles 540 is further describe below.

By way of example, micro particles may be hierarchically structured microparticles 200.

FIGS. 6A-6D show SEM images of a porous structure of a filter modified by hierarchically structured microparticles according to some embodiments. More specifically, FIG. 6A is an SEM image of a fiberglass filter media, FIG. 6B is an SEM image of a fiberglass filter media treated with DE, and FIGS. 6C and 6D are SEM images of a DE modified with surface nano-features.

Regarding FIG. 6A, the SEM image illustrates an unmodified porous structure of a fiberglass medium that includes fiberglass fibers 620. FIG. 6B on the other hand, depicts a similar fiberglass medium including fiberglass fibers 620 that are coated with hierarchically structured microparticles in this case being DE particles 640. As shown in FIG. 6B, DE particles 640 occupy a majority of empty space between fiberglass fibers of the primary porous structure. For example, DE particles 640 occupy at least 15%, 25%, 50%, 75% of empty space between fiberglass fibers of the primary porous structure.

FIGS. 6C and 6D, on the other hand, show SEM images of DE particles that are treated with additional functional materials. More specifically, FIG. 6C shows an image of a single DE particle 650 coated/modified with nanostructured coating 660. FIG. 6D, on the other hand, shows a portion of nanostructured coating 650 at high magnification indicating nanofeatures 660 in form of randomly oriented plates/nanoarrays. In these figures, the surface nano-features includes manganese oxide nano arrays (e.g. vertically aligned sheets or wrinkles) grown on the surface of DE. Some functionalities of these structures are further described below.

Figure 7A:
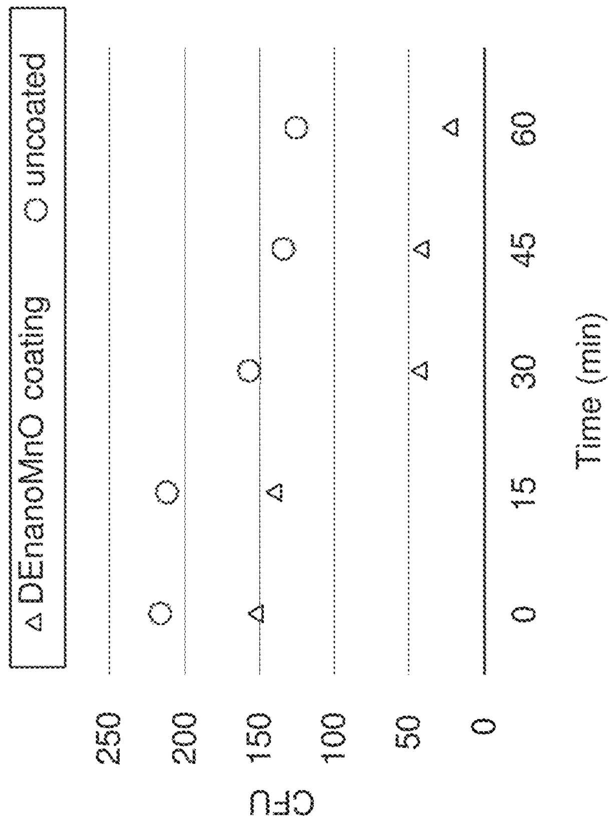
FIG. 7A illustrates results from an antimicrobial test using DE with manganese oxide nanostructured coatings with nano-rough edges according to some embodiments.

FIG. 7A illustrates results from an antimicrobial test using DE with manganese oxide nanostructured coatings with nano-rough edges (e.g. vertically aligned sheets or wrinkles shown in FIGS. 6C and 6D). Fiberglass flat media shown on FIG. 6D was tested for antimicrobial properties with Staph aureus (ATCC 6538) demonstrated 76% reduction in viable bacteria compared to unmodified samples. FIG. 7A illustrates results from an antimicrobial test using fiberglass media shown on FIGS. 6A-6D. The experiment involved deposition of bacteria Staph on two types of fiberglass media for different periods of time followed by extraction and incubation on agar plates. The bacteria were counted (colony forming units, CFU) after each period. FIG. 7A shows two sets of data counts: one for the samples extracted from unmodified fiberglass (circles) and another for fiberglass coated with modified DE. The results indicate that coated media contained about 24 CFU after 60 min, while uncited fiberglass media contained ~125 CFU. This corresponds to ~76% reduction in viable bacteria for DE modified sample compared to only ~40% for unmodified samples.

Figure 7B:
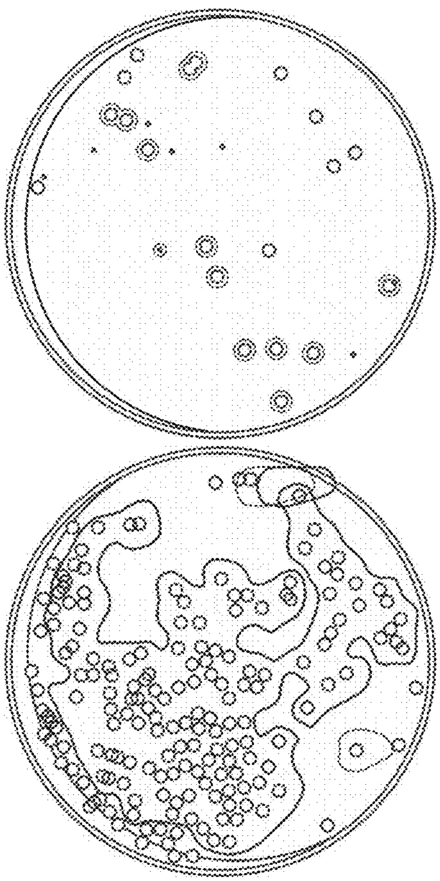
FIG. 7B shows optical microscope images of Agar plates with Staph extracted from unmodified and modified medi after incubation for 60 min according to some embodiments.

FIG. 7B shows optical microscope images of Agar plates with Staph extracted from unmodified and modified media (corresponding to FIGS. 6A and 6B, respectively) after incubation for 60 min. While bacteria successfully grew on unmodified media during the incubation (FIG. 7B, left plate), almost no growth was observed after incubation with modified filter (FIG. 7B, right plate). This indicates that MnO-modified DE coating exhibited an antibacterial function.

Figure 8:
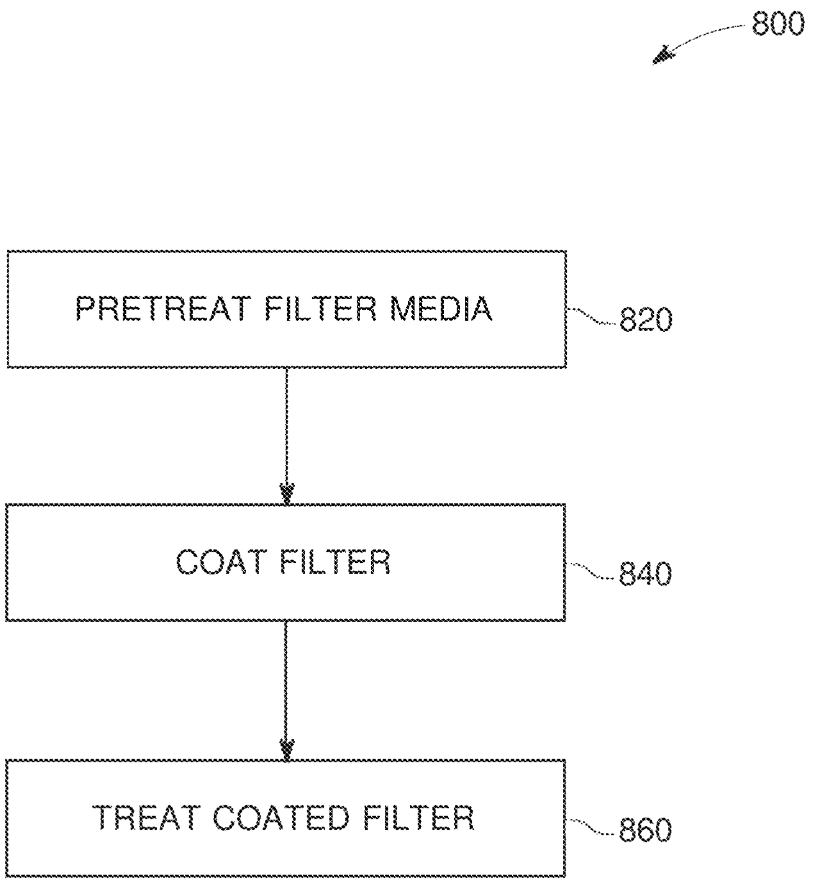
FIG. 8 illustrates a flow chart for a method 800 for fabricating a coating composed of hierarchically structured microparticles of natural origin according to some embodiments.

FIG. 8 illustrates a flow chart for a method 800 for fabricating a coating composed of hierarchically structured microparticles of natural origin (e.g. DE-coated filter) in accordance with some embodiments.

In some embodiments, the coating is composed of hierarchically structured microparticles particles of synthetic origin in accordance with some embodiments.

At 820, the filter media is pretreated. Filter media pretreatment may include, but is not limited to, one or more of the processes of cleaning, drying, activation, modification with active components to improve adhesion of DE, etc.

In some embodiments the activation of the filter media includes corona treatment.

At 840, the filter media is coated. For example, DE may be deposited on a porous structure of the filter media thereby providing a "coated filter". DE deposition may include, but is not limited to, one or more of the processes of dry deposition methods such as dry powder deposition, wet deposition methods utilizing a DE slurry such as dip-coating, roll-to-roll coating, and spray coating. In these embodiments, the DE slurry may be formulated using DE particles/microparticles, solvent (e.g., water) and additives. In some embodiments, DE particles may be modified as discussed above before slurry preparation. In some embodiments, the additive may serve different functions (e.g., binder, stabilizer, thickener) and include organic, inorganic materials and their mixtures.

In some embodiments, hierarchically structured particles may be coated on non-porous surfaces (e.g. tables, door handles, parts of medical equipment et.) using methods described above.

In some embodiments, the coating on such surfaces may have antimicrobial or antiviral (biocidal) function.

In some other embodiments, DE particles may be modified after slurry preparation and coating.

At 860, the coated filter is treated. This further treatment includes, but is not limited to one or more of the processes drying, calcination, etc.

In some embodiments, a method of fabricating a hierarchical material structure is provided.

Some embodiments provide a method of fabricating nanostructured features on the surface of hierarchical microparticles. The fabrication method may include preparing a solution, which comprises nano-features precursors and microparticles (e.g., BM), and thermally treating the solution to fabricate the hierarchically structured material.

In some embodiments, after initial modification of microparticles, the second modification is performed. Introduction of second modification may further enhance the surface area and introduce new functionality.

Figure 9:
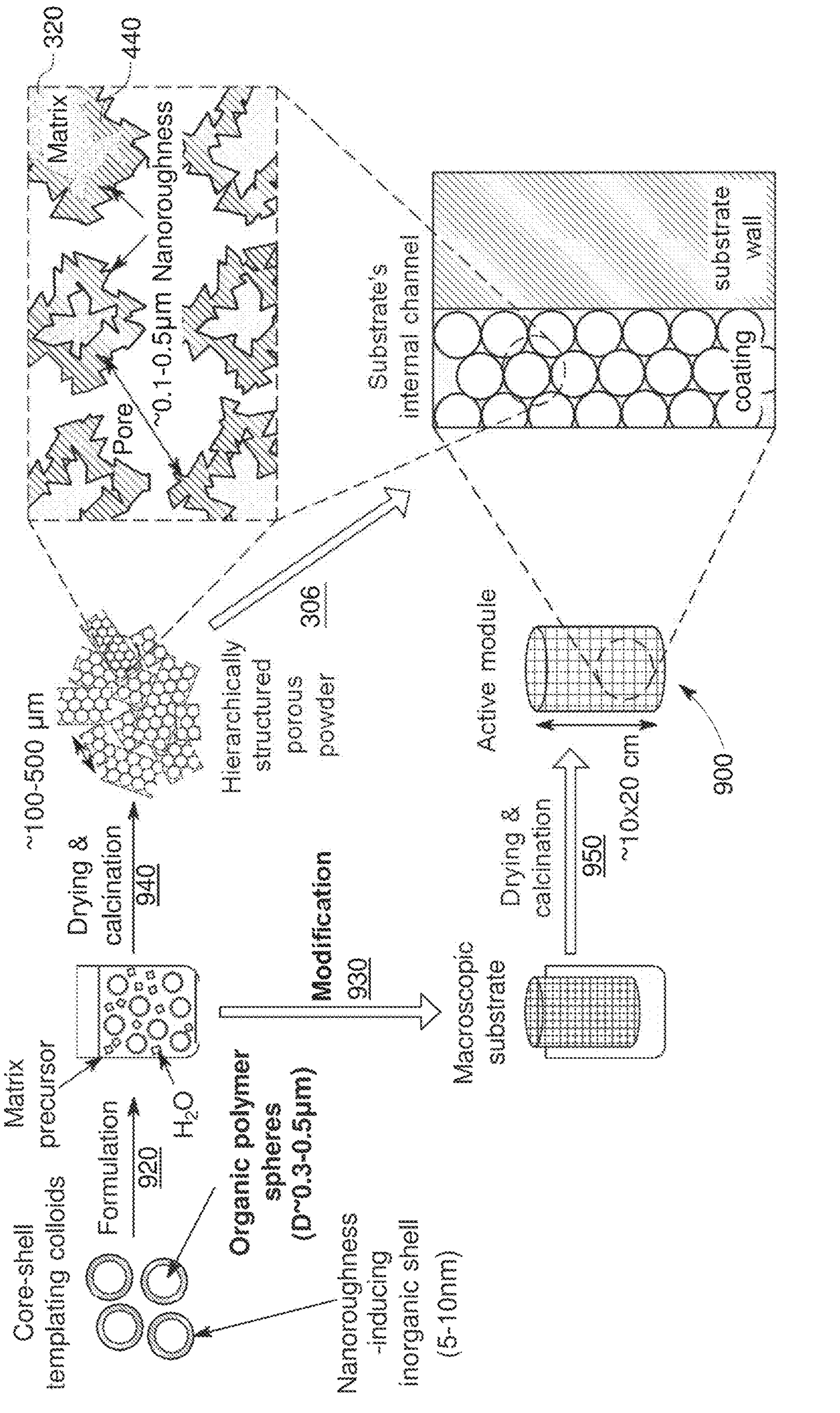
FIG. 9 illustrates a process for producing a modified macroscopic porous substrate according to some embodiments.

FIG. 9 illustrates a process for producing a modified macroscopic porous substrate according to some embodiments.

At step 920, a solution may be prepared by dispersing matrix precursors and core-shell templating colloids in a solvent (e.g., water). The core-shell templating colloids may include a polymer colloid (e.g., polystyrene) core coated with a thin layer (e.g., 10-30 nm) of nanoroughness-forming (NRF) material.

Subsequently, at step 940, the coating solution may be dried and calcined to make the hierarchical material or the hierarchically structured porous microparticles as discussed above.

The hierarchically structured porous microparticles may then be applied to a macroscopic substrate (step 306). Optionally, one or more binders may be added to improve adhesion and mechanical robustness of the coating to the substrate surfaces.

In some other embodiments, the solution may be applied to a macroscopic porous substrate (step 930), e.g., via dip coating, followed by thermal treatment of the coated macroscopic substrate (step 950). As a result, the macroscopic porous substrate 930 coated with the hierarchical material structure may be obtained.

In these embodiments, the thermal treatment or dissolution of templating colloids (step 940 or 950) may provide: (i) removal of the polymer portion to create a porous network, (ii) solidification of the matrix material to form the carrier for the thin NRF layer, and/or (iii) creation of nano-roughness from the NRF layer at the pore/matrix interface, which may be used for pathogen destruction. As such, the thermal treatment may be performed at a temperature above the melting point of the polymer colloid core. By way of example, the temperature for the thermal treatment may be in a range of about 100° C. to about 500° C. In some embodiments, the thermal treatment may be performed in a reduced pressure environment, in a vacuum or near-vacuum environment, or in an inert-gas (e.g., nitrogen or argon) environment.

In certain embodiments, the matrix material may be made from a single compound or mixtures of different compounds. The matrix material may be, for example, catalytically active, stimuli-responsive, chemically robust, degradable, and/or exhibit specific thermal and mechanical properties.

By way of example, the matrix material may include any of oxides, mixed oxides, mixed oxides of elements from one or more groups I, II, III, IV V, VI, zeolites, oxohydroxides, aluminates, silicates, alumosilicates, titanates, oxometallates, metal-organic frameworks, vanadia, silica, alumina, titania, zirconia, hafnia, nickel oxide, cobalt oxide, copper oxide, tin oxide, manganese oxide, magnesium oxide, noble metal oxides, platinum group metal oxides, molybdenum oxides, tungsten oxides, rhenium oxides, tantalum oxide, niobium oxide, chromium oxides, scandium, yttrium, lanthanum, thorium, rare earth oxides, and any combinations thereof.

In some embodiments, the matrix material may include any of a synthetic polymer, a natural polymer, a biopolymer, and any combinations thereof.

In some embodiments, the matrix material may include biogenic material such as diatomaceous earth, pollen, and silica-based microparticles of biological origin.

In certain embodiments, the matrix materials may include a semiconductor, such as silicon, germanium, tin, silicon doped with group III or V elements, germanium doped with group III or V elements, tin doped with group III or V elements, and any combinations thereof.

In certain embodiments, the matrix materials may include one or more metal sulfides, metal chalcogenides, metal nitrides, metal pnictides, and any combinations thereof.

In certain embodiments, the matrix materials may include one or more organometallic compounds, such as metal organic frameworks, inorganic polymers (e.g., silicone), organometallic complexes, or any combinations thereof.

In some embodiments, the macroscopic porous substrate may be directly machined, e.g., by etching, to introduce surface nano-roughness thereon. For example, the etching process may include, but is not limited to, wet etching, dry etching, ion etching, plasma etching, or the like.

In some such embodiments, the nanoscale features may be formed on the microscopic microparticles after the microscopic microparticles are coated on the macroscopic substrate.

In certain embodiments, the matrix precursor material may be in the form of a sol-gel precursor, a nano-particulate precursor, or any combinations of thereof. In some such embodiments, the sol-gel matrix precursor material may include a silica, alumina, titania, ceria and/or zirconia sol-gel, and the nano-particulate precursor may include a single or a mixture of nanoparticles of the matrix materials described above. In some such embodiments, the nano-particulate precursor may include aluminum hydroxide oxides such as boehmite.

As described herein, the "matrix precursor materials" may be converted into "matrix materials" through one or more fabrication processing, such as high-temperature calcination, drying, light-induced polymerization, thermal polymerization or radical polymerization, supramolecular polymerization, other curing processes, and any combinations thereof.

The core-shell systems discussed above may provide a combinatorial approach to the material design to systematically address specific cases. In a single fabrication process, various pore sizes may be introduced by choosing appropriate polymer colloid diameters and different shell composition to achieve variations in the dimensions of the nanoscale features, tuned to achieve a desired biocidal function.

Hereinbelow, some examples of the hierarchical material structures and methods for fabricating the same according to the present teachings will be described.

Figure 10:
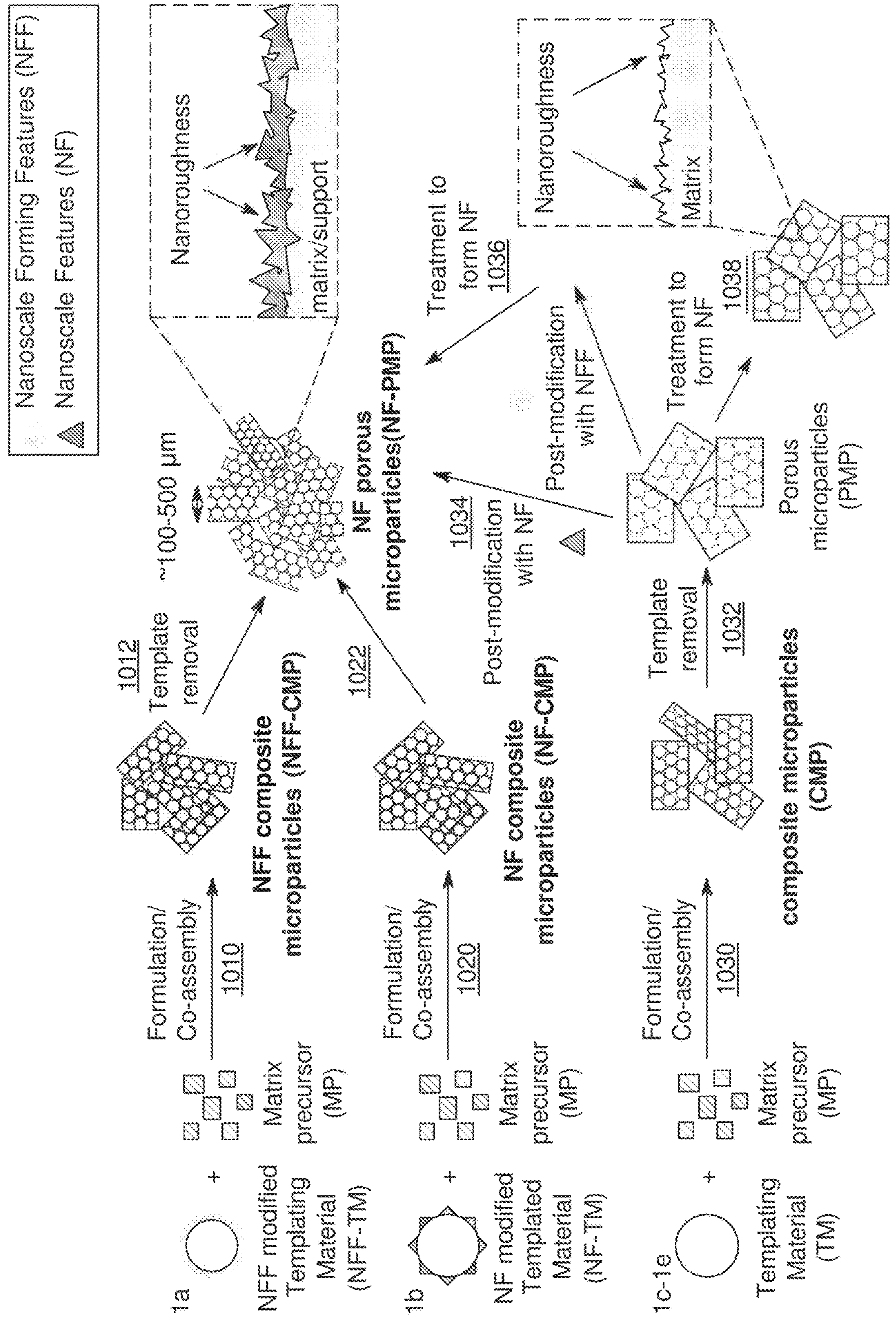
FIG. 10 shows the combination of porous microparticles and nanoscale features (NF) formed at the pore-matrix interface according to some embodiments

Example 1: Porous Microparticles+Nanoscale Features (NF) at Pore-Matrix Interface Referring to FIG. 10, the combination of porous microparticles and nanoscale features (NF) formed at the pore-matrix interface may include, but not limited to, the following 6 configurations, each of which is fabricated as described below.

(i) Example 1a co-assembly of nanoscale forming features (NFF) (step 1010) modified templating material (NFF-TM) and matrix precursor (MP) to obtain NFF composite microparticles (NFF-CMP); and (ii) removal of templating and formation of NF (step 1012) on the pore-matrix interface to obtain NF porous microparticles (NF-PMP).

Example 1b (i) co-assembly of NF modified templating material (NF-TM) (step 1020) and MP to obtain NF composite microparticles (NF-CMP); and (ii) removal of templating to obtain NF-PMP (step 1022).

Example 1c (i) co-assembly of templating material (TM) and MP (step 1030) to obtain composite microparticles (CMP);

(ii) removal of templating (step 1032) to obtain porous microparticles (PMP); and (iii) post-modification with pre-formed NF (e.g., via impregnation, deposition, etc.) to obtain NF-PMP.

Example 1d (i) co-assembly of TM and MP (step 1030) to obtain CMP;

(ii) removal of templating (step 1032) to obtain PMP;

(iii) post-modification with NFF (step 1034) (e.g., via impregnation); and (iv) treatment to obtain NF-PMP (step 1036).

Example 1e (i) co-assembly of TM and MP (step 1030) to obtain CMP;

(ii) removal of templating (step 1032) to obtain PMP; and (iii) post-modification to introduce NF (step 1036) (e.g., via mechanical treatment, etching, etc.) (step 1038) to obtain NF-PMP.

Figure 11:
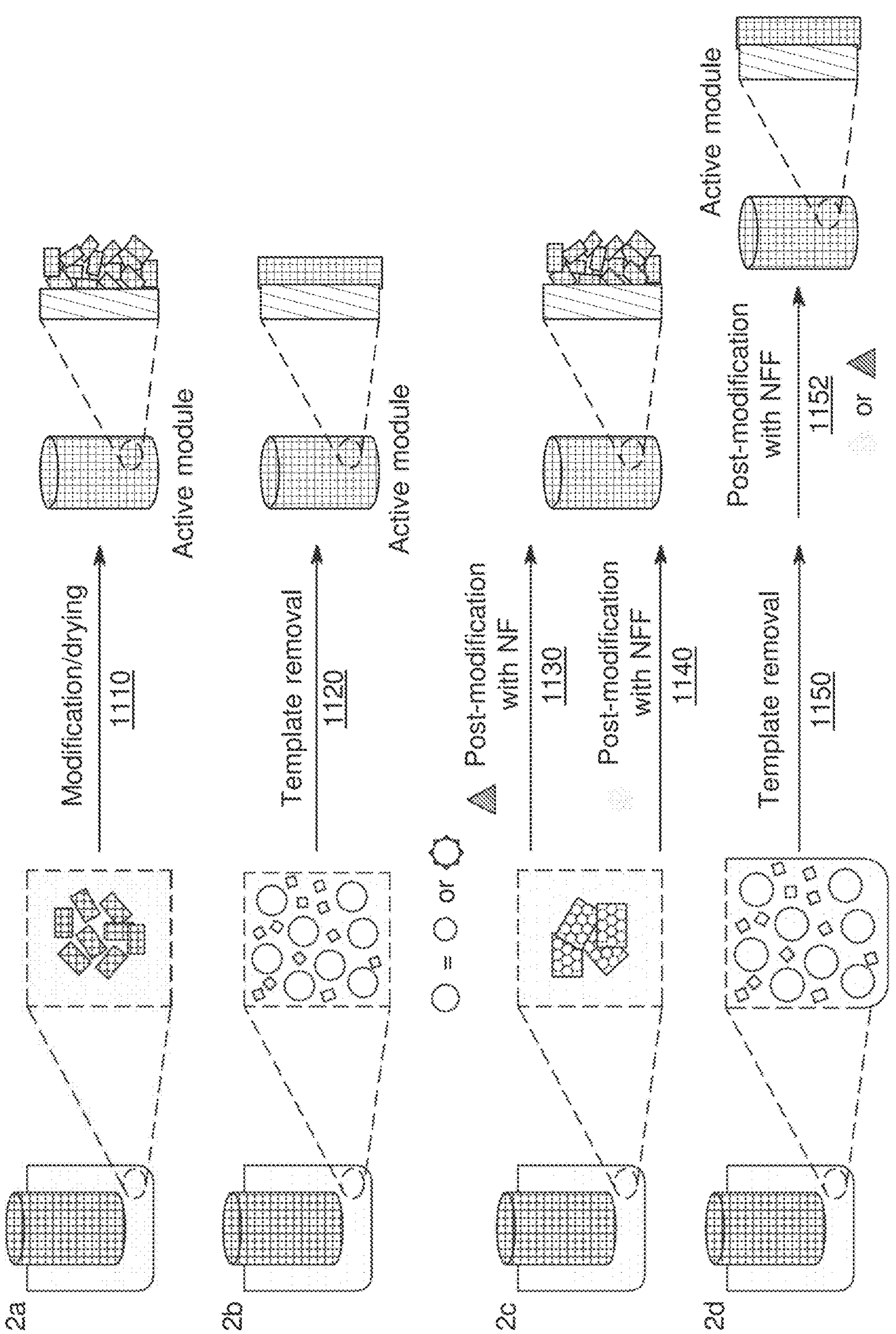
FIG. 11 illustrates a macroscopic substrate coated and/or modified with the combination of microporous coating and NF formed at the pore-matrix interface according to some embodiments.

Example 2: Macroscopic Substrate Coated and/or Modified With Microporous Coating+Nanoscale Features (NF) at Pore-Matrix Interface Referring to FIG. 11, the macroscopic substrate coated and/or modified with the combination of microporous coating and NF formed at the pore-matrix interface may include, but not limited to, the following 4 configurations, each of which is fabricated as described below.

Example 2a (i) modification of the macroscopic substrate with pre-formed NF-PMP (step 1110) (e.g., via dip coating, spray coating, roll-to-roll, etc.).

Example 2b (i) modification of the macroscopic substrate via co-assembly of NFF or NF-modified TM and MP (e.g., co-assembly directly on the walls of macroscopic substrate); and (ii) removal of templating and formation of NF (step 1120) on the pore-matrix interface of the coating.

Example 2c (i) modification of the macroscopic substrate with pre-formed PMP; and (ii) post-modification with NF (step 1130) or with NFF (step 1140) followed by treatment to form NF.

Example 2d (i) modification of the macroscopic substrate via co-assembly of TM and MP on the macroscopic substrate channel;

(ii) removal of templating (step 1150); and (iii) post-modification with NFF or directly with NF (step 1152).

Figure 12:
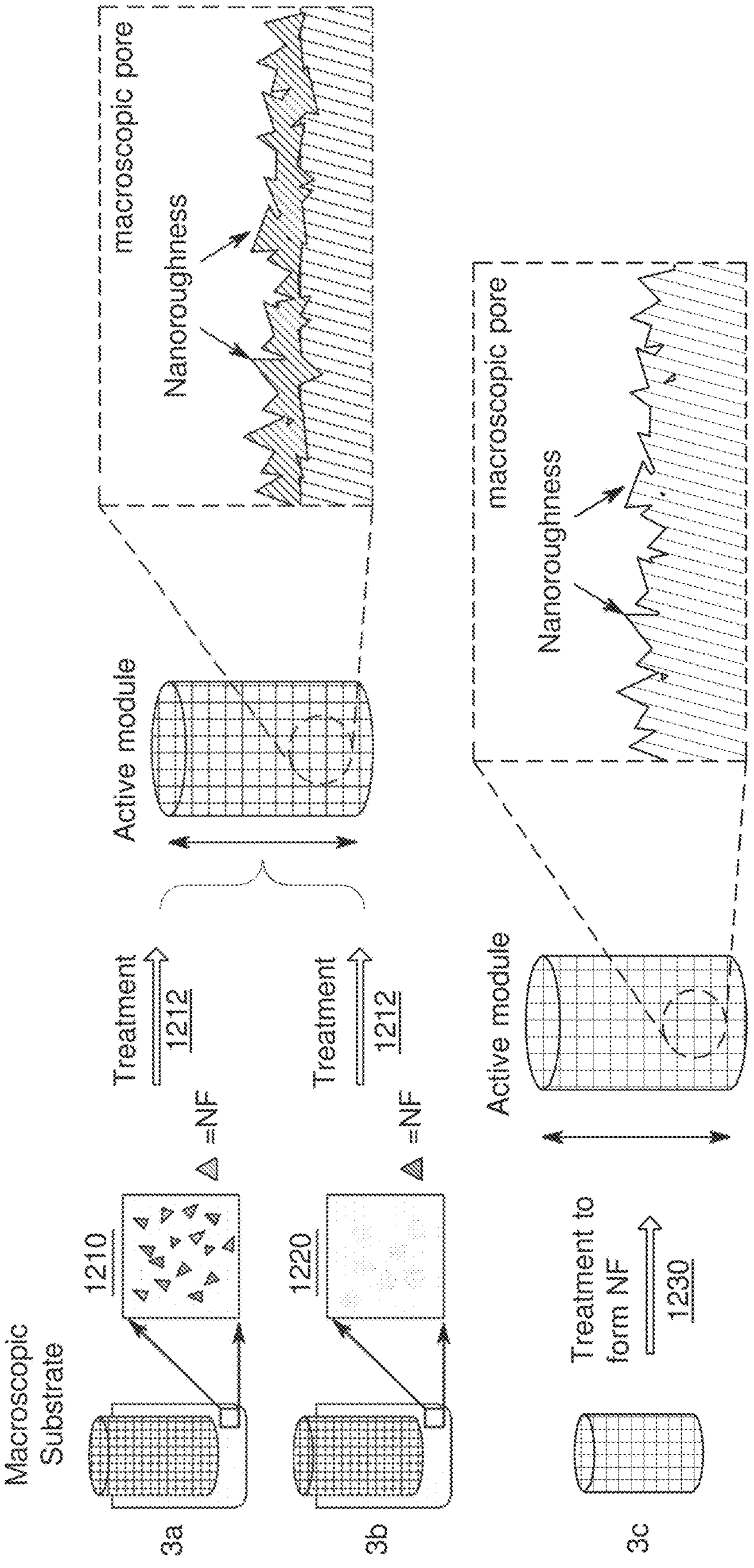
FIG. 12 illustrates a macroscopic substrate with NF formed at the interface between the pore and the channel of the macroscopic substrate according to some embodiments.

Example 3: Macroscopic Substrate+Nanoscale Features (NF) at Pore-Macroscopic Substrate Channel Interface Referring to FIG. 12, the macroscopic substrate with NF formed at the interface between the pore and the channel of the macroscopic substrate may include, but not limited to, the following 3 configurations, each of which is fabricated as described below.

Example 3a (i) modification of the macroscopic substrate with NFF (step 1210) (e.g., via dip coating, spray coating, roll-to-roll, etc.); and (ii) treatment to form NF (step 1212).

Example 3b (i) modification of the macroscopic substrate with pre-formed NF (step 1220).

Example 3c (i) treatment of the macroscopic substrate to form NF (step 1230) (e.g. via etching).

The coating method is chosen by type of the substrate. For example, for 3D substrates the method may be based on dip-coating, while for 2D substrates (e.g. flat substrates, surfaces) the methods may include roll-to-roll coating, and spray coating.

In a related aspect, compositions are disclosed that include an agglomeration of a plurality of microparticles forming a hierarchically porous material structure. As discussed in more detail below, in some embodiments, the compositions can further include a plurality of binder particles that facilitate the agglomeration of the microparticles into a cohesive material structure. Further, in some embodiments, one or more porous coatings can cover at least a surface portion of one or more of the microparticles.

Figure 13:
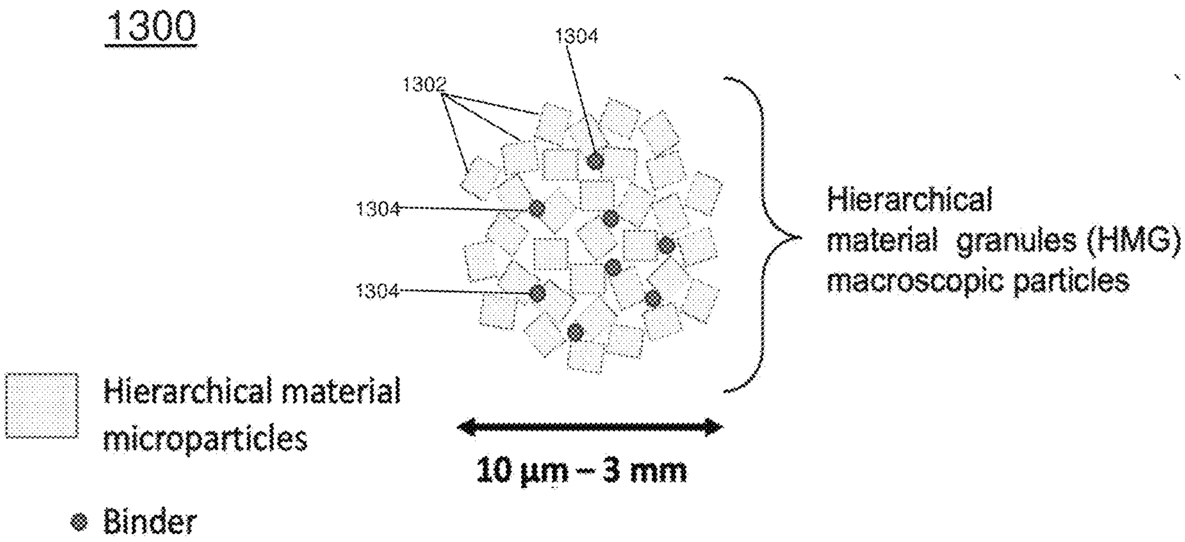
FIG. 13 is a schematic representation of a hierarchical granulated material according to an embodiment of the present teachings.

By way of illustration, FIG. 13 schematically depicts a composition 1300 according to an embodiment, which is herein also referred to as a hierarchical granulated material (HGM), that includes an agglomeration of a plurality of microscopic particles 1302 (herein also referred to as microparticles 1302) that collectively form a porous material structure and a plurality of binder particles 1304 that are dispersed within the pores of the hierarchical porous material structure. In some embodiments, the microscopic particles 1302 themselves are porous, e.g., with pores characterized by a size, e.g., a diameter, in a range of about 50 nm to about 10 microns, e.g., in a range of about 100 nm to about 8 microns or in a range of about 200 nm to about 5 micros, or in other subranges in the range of about 50 nm to about 10 microns. The binder particles 1304 facilitate the agglomeration of the microparticles 1302. By way of example, the binder particles 1304 can improve adhesion between the microparticles, thereby improving the mechanical strength of the granulated material structure. As discussed above, the binder particles can be formed of a variety of different materials and can have a variety of different shapes, including regular and irregular shapes. By way of example, and without limitation, the binder particles can be formed of a polymeric or a composite material. By way of example, and without limitation, the binder particles can be a plurality of metal oxide nanoparticles, e.g., silica or alumina nanoparticles.

In general, the binder particles are lodged between the microparticles and/or between the contact areas of the microparticles and effectively serve as a “glue” or “mortar” to facilitate the assembly of the microparticles. By way of illustration, the size of the binder particles can range from about 1 nm to about 1000 nm. In general, the size of the binder particles depends on the size of the pore of microparticles—it should be equal or larger than the microparticles pores (otherwise the binder particles can penetrate inside the pores of the microparticle and become inaccessible for the binding.)

In various embodiments, the size of the granulated hierarchical structure 1300 can be in a range of about 10 microns to about 3 mm, e.g., in a range of about 100 microns to about 1 mm, or in a range of about 200 microns to about 2 mm, or any other subrange within the range of about 10 microns to about 3 mm.

The microparticles 1302 can include one or more synthetic or one or more naturally-occurring materials (which is herein also referred to as a biogenic material), or as a combination of one or more synthetic and biogenic materials, such as those listed above. In some embodiments, the biogenic material forming the microparticles can be synthetically modified, e.g., to incorporate a hierarchical structure on the surface of biogenic material.

More generally, in various embodiments, the microparticles 1302 can include a hierarchy of structural features characterized by different sizes. For example, in some embodiments, a first set of nanoscale features may be disposed on at least a portion of a surface of a core portion of one or more of the microparticles 1302. In some such embodiments, a second set of nanoscale features may be disposed on at least a portion of the first set of the nanoscale features. In some embodiments, the average pore sizes of the first and the second nanoscale features can be different so as to generate a hierarchically-sized porous coating on the surfaces of the microparticles.

For example, the microparticles 1302 can have the hierarchical structures discussed above in connection with FIG. 2. In particular, with reference to FIG. 2, one or more of the microparticles 1302 can be in the form of a microparticle 210 that includes a core **210*a* on which a first nanoscale-feature-set 220, modified feature-set 230, and a second nanoscale-feature-set 240 are disposed. Microparticle 210 can be a synthetic or a biogenic microparticle, such as those listed above. By way of example, microparticle 210 can be formed of DE. In this embodiment, any of the nanoscale-feature-sets 220 and 240 can have a thickness in a range of about 1 nm to about 50 nm, by way of example. Further, as discussed above, any of the nanoscale-features-sets 220 and 240 can be formed of the materials discussed above, such as, oxides, mixed oxides, transition metal oxides, etc. By way of example, in some embodiments, the nanoscale-feature-set 220 can exhibit a barbed morphology. The dimensions of this type of morphology can be also described using an aspect ratio defined as the length of the feature divided by its average width or diameter. In various embodiments, the aspect ratio of the nanoscale-features-sets 220 and 240** can be in the range of 1 to 100, e.g., in a range of about 10 to about 90, or in a range of about 20 to about 80, or in a range of about 30 to about 70, or in a range of about 40 to about 60, or in any subrange within the range of about 1 to 100.

In some such embodiments in which the nano-scale-feature set 220 exhibits a barbed morphology, the material from which the nanoscale-features-set 220 is formed can be a transition metal oxide, such as manganese oxide.

In some embodiments, the microparticles themselves can exhibit a porous structure. By way of illustration, an example of such a porous internal structure of the microparticles can found in FIG. 3. For biogenic microparticles, the examples of porous structures are shown on FIG. 1. As shown in FIG. 3, in some embodiments, microparticle 210 can include a matrix 300 formed by a number of intersecting elements 320*a* that are patterned to provide a number of interconnected pores 320*b*. In some embodiments, interconnected pores 320*b* of porous microparticle 210 may exhibit a cross-sectional dimension in a range of about 50 nm to about 10 microns, e.g., in a range of about 100 nm to about 5 microns, or in a range of about 500 nm to about 1 micron, by way of example. In some embodiments, interconnected pores 320*b* may exhibit a surface area to weight ratio (specific surface area, SSA) in the range of about 10 $m^2/g$ to about 1,000 $m^2/g$, or in a range of about 100 $m^2/g$ to about 500 $m^2/g$. While in some embodiments, microparticle 210 can have a single type of porosity, such as microporosity, mesoporosity or macroporosity, in other embodiments, microparticle 210 can exhibit porosity at a plurality of size scales, that is, microparticle 210 can exhibit hierarchical porosity.

A variety of fabrication techniques can be employed for fabricating a granulated hierarchical structure according to various embodiments of the present teachings. By way of example, fabrication techniques known as granulation (also known as tumbling agglomeration) can be employed. The basic granulation method is called tumble/growth size enlargement method, which produces agglomerates of approximately spherically-shaped granulated materials by build-up of fine particulate solids during tumbling. Typically, a binder is employed in such fabrication techniques, which can lead to the formation of loose agglomerate structures.

Another fabrication technique that can be employed in various embodiments is pressure agglomeration, which is also known as tableting. Pressure agglomeration can be implemented using hydraulic presses and different tableting molds.

Figure 16:
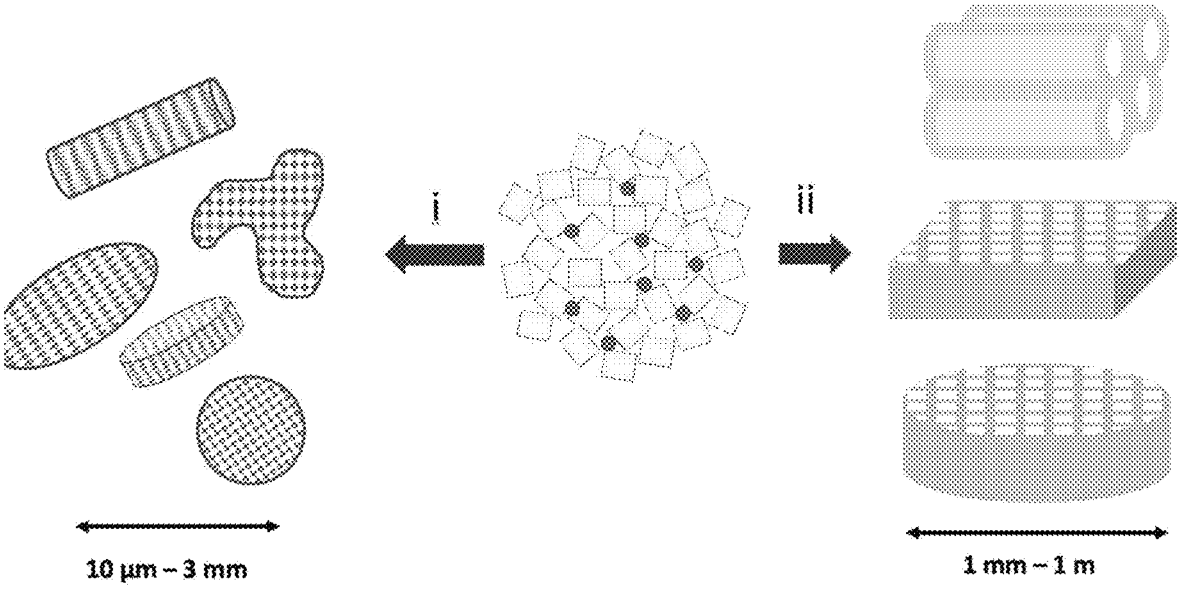
FIG. 16 schematically shows examples of agglomerates and methods for their fabrication in accordance to various embodiments.

FIG. 16 schematically shows some examples of such agglomerates and methods of their fabrication. For example, process (i) shows the use of tumbling agglomeration or pressure agglomeration to produce particles with various shapes.

Another class of fabrication techniques, generally known as thermal agglomeration, employ heat transfer processes for causing agglomeration of a plurality of particles. Typically, such processes involve sintering through heat application, solidification through cooling, or coagulation through melting. Extrusion and molding can also be utilized to form agglomerated substrates/pellets. In extrusion agglomeration, material masses can be subjected to forces pressing them through an extrusion die plate to form pellets or monolithic structures.

Process (ii) on FIG. 16 shows the use of an extrusion process to create monolithic structures.

Figure 14:
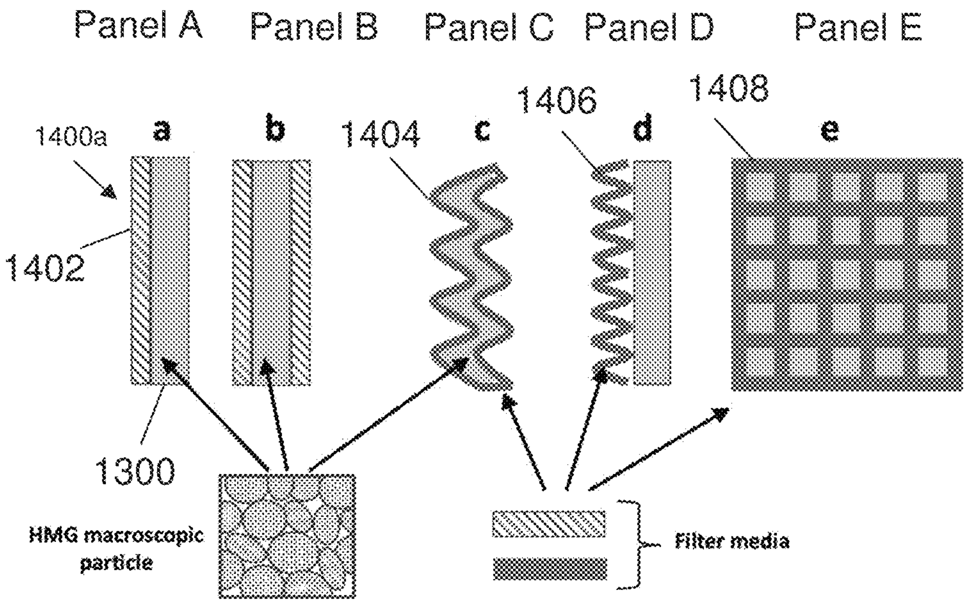
FIG. 14 schematically depict examples of filtration systems according to various embodiments in which the hierarchical granulated material illustrated in FIG. 13 is incorporated.

One application of a granulated hierarchical structure according to the present teachings, such as the above granulated hierarchical structure 1300, is its use in filtration systems. By way of example, FIG. 14 schematically depict several air filtration systems in which the granulated hierarchical structure 1300 is incorporated, where the granulated hierarchical structure 1300 can provide filtration of at least one contaminant in the ambient air. In various embodiments, the function of the granulated hierarchical structure 1300 is mainly sorption.

With reference to Panel A in FIG. 14, an air filtration system 1400*a* includes a filter medium 1402*a*, such as fiberglass or polymer (e.g., electret), that receives external air and is coupled to a granulated hierarchical structure 1300 according to the present teachings. The thickness of the filter medium 1402*a* and that of the granulated hierarchical structure 1300 can be selected to be suitable for a particular filtration application. By way of example, in some embodiments, the filtration medium 1402 can have a thickness in a range of about 0.1 to about 2 mm and the granulated hierarchical structure 1300 can have a thickness in a range of about 0.5 to about 10 cm. By way of example, the filter media can remove particulate matter (particles in the range of 0.01 to 30 microns) and granulated structure can remove gaseous contaminants from an air stream introduced into the filtration system.

By way of another example, in Panel B of FIG. 14, another air filtration system 1400*b* according to an embodiment is depicted, which includes the granulated hierarchical structure 1300 according to the present teachings, which is enveloped by a filter medium 1402*b*. The material composition of the filter medium 1402*b* can be any one of or a combination of those discussed above in connection with embodiment in Panel A. In this embodiment, the filter medium 1402*b* has an undulating profile, which enhances the surface area of the filter medium.

Panel C of FIG. 14 schematically depicts another air filtration system 1404*c* according to an embodiment, which includes an undulating filter medium 1402, having a composition such as those discussed above, that is coupled to a surface of the granulated hierarchical structure 1300.

Panel D of FIG. 14 schematically depicts yet another air filtration system 1406*d* according to an embodiment, which includes an undulating filter medium 1402*d*, having a composition such as those discussed above, that is coupled to a surface of the granulated hierarchical structure 1300. The undulating structure can be also called pleated structure (pleated filter).

Panel E of FIG. 14 schematically depicts another air filtration system 1408*e* that includes a support structure 1402*e* having a plurality of openings 1403 in each of which the granulated hierarchical structure 1300 is disposed. In this embodiment, the openings are distributed according to a checkerboard pattern, though in other embodiments other patterns can also be employed.

Figures 15A, 15B, 15C, 15D, 15E, 15F, 15G, 15H:
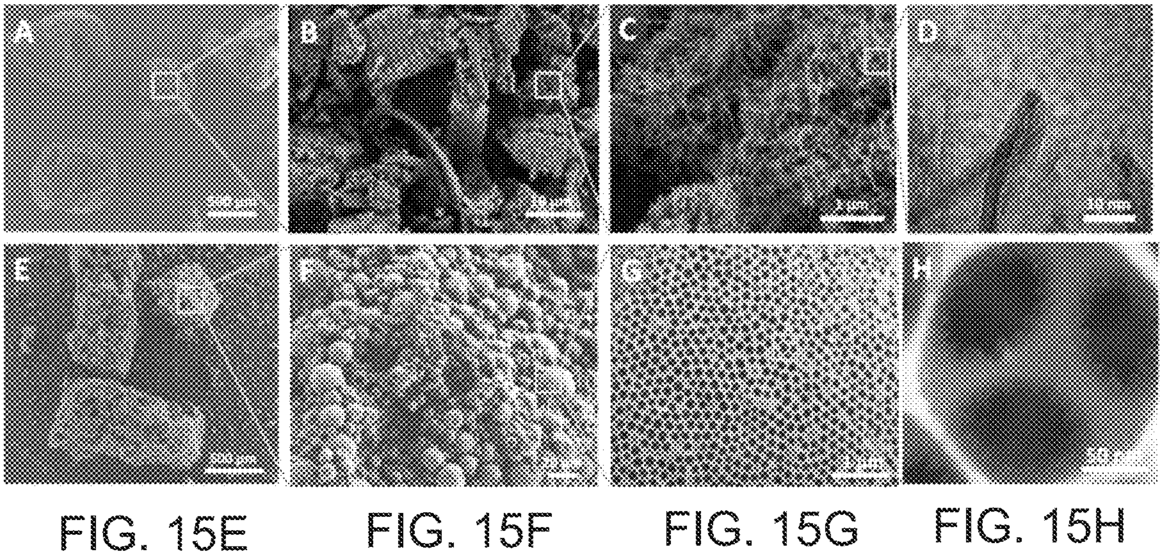
FIG. 15A is a representative, low magnification scanning electron microscopy (SEM) image of a plurality of hierarchical granulated material particles according to an embodiment of the present teachings. Each particle includes agglomerated DE microparticles. Average size of agglomerated particles is about 300-2000 um.
FIG. 15B is a representative, higher magnification scanning electron microscopy (SEM) image of a plurality of individual DE particles according to an embodiment of the present teachings.
FIG. 15C is a representative, high magnification SEM image of nanostructured $MnO_2$ coating deposited on the DE surface with barbed morphology with an aspect ratio about 20 according to an embodiment of the present teachings.
FIG. 15D is a representative, transmission electron microscope (TEM) image of individual nanostructured $MnO_2$ features present on the DE surface shown on FIG. 15C.
FIG. 15E is a representative, low magnification SEM image of a plurality of hierarchical granulated material particles according to an embodiment of the present teachings. Each particle includes agglomerated synthetic porous microparticles ($Al_2O_3$). Average size of agglomerated particles is about 500-5000 μm.
FIG. 15F is a representative, higher magnification SEM image of a plurality of synthetic porous nanostructured microscopic particles according to an embodiment of the present teachings.
FIG. 15G is a representative, high magnification SEM image of individual nanostructured microparticle surface showing a plurality of nanopores having a size of about 200 nm.
FIG. 15H is a representative, high magnification SEM image of the pore of nanostructured microparticle shown in FIG. 15G with nanoscale surface features with an aspect ratio in the range of 1-2.

FIG. 15A is a low magnification scanning electron microscopy (SEM) image of a plurality of hierarchical granulated material particles according to an embodiment. Each particle includes agglomerated DE microparticles. Average size of agglomerated particles is about 300-2000 um.

FIG. 15B is a higher magnification scanning electron microscopy (SEM) image of a plurality of individual DE particles according to an embodiment of the present teachings.

FIG. 15C is a high magnification SEM image of nanostructured MnO2 coating deposited on the DE surface with barbed morphology with an aspect ratio about 20 according to an embodiment.

FIG. 15D is a transmission electron microscope (TEM) image of individual nanostructured MnO2 features present on the DE surface shown on FIG. 15C.

FIG. 15E is a low magnification SEM image of a plurality of hierarchical granulated material particles according to an embodiment. Each particle includes agglomerated synthetic porous microparticles (Al2O3). Average size of agglomerated particles is about 500-5000 μm.

FIG. 15F is a higher magnification SEM image of a plurality of synthetic porous nanostructured microscopic particles according to an embodiment.

FIG. 15G is a high magnification SEM image of individual nanostructured microparticle surface showing a plurality of nanopores having a size of about 200 nm.

FIG. 15H is a high magnification SEM image of the pore of nanostructured microparticle shown in FIG. 15G with nanoscale surface features with an aspect ratio in the range of 1-2.

In some embodiments, one or more nanostructured coatings disposed on the surfaces of the microparticles can be configured to provide a filtration function of interest. For example, as noted above, in some embodiments the nanostructured coatings can be configured to allow trapping and/or killing of one or more pathogens in a medium, e.g., in ambient air.

In some embodiments, one or more nanostructured coatings disposed on the surfaces of the microparticles can be configured to provide different functions, e.g. sorption, catalytic or both, and, as a result improve/enhance the removal efficiency (filtration) of pollutants.

For example, as noted above, in some embodiments the nanostructured coatings can be configured to enhance sorption capacity through enhanced surface area due to the nanostructuration and/or through the choice of the composition with enhanced chemical affinity toward specific contaminants (e.g. MOFs, activated carbon).

In some embodiments, nanostructuration of transition metal oxides deposited on the surfaces of microparticles can impart catalytic properties and facilitate the decomposition of adsorbed species such as gases (e.g., oxidation of formaldehyde into $CO_2$ and water) and particulate matter (PM).

In some embodiments, certain morphology, e.g. barbed sharp morphology, of the coating can cause physical/mechanical damage to the pathogen's membrane and facilitate its killing or deactivation.

The term "particulate," as used herein, refers to a variety of inorganic, organic, and mixed inorganic and organic material structures, including naturally-occurring and artificial material structures, such as a variety of microorganisms (e.g., bacteria and/or viruses), and smoke particulates. By way of example, such a particulate may have a size of at most about 10 microns or below (e.g., "PM10"), or at most about 2.5 microns or below (e.g., "PM2.5"), or at most about 1 micron or below (e.g., "PM1"), or at most about 300 nm or below. The term "ultrafine particulate," typically refers to a particulate having a size of at most about 0.1 microns ("PM0.1") or below.

The terms "treat" and "treatment" are used herein to refer to oxidation, reduction, inactivation, degradation, and/or filtration (e.g., removal) (or a combination thereof) of a contaminant (e.g., gas, vapor, particulate matter, aerosol, bioaerosol, or pathogen) from a medium (e.g., a gas or liquid medium), including a flowing medium, e.g., in the form of a polluted stream.

The term "entrapment," as used herein, refers to a permanent or temporary capture of a contaminant (e.g., a particulate) by a structure according to the present teachings.

The terms "pore," "passage," "passageway," and "channel" are herein used interchangeably to refer to a material structure having at least one opening for receiving the flow. The pores may be of a spherical or non-spherical shape, e.g., linear, curvilinear, tortuous, bifurcating, or branched cavity that may provide an enclosure or a surface that is exposed to the flow.

The term "size" as used herein refers to a cross-sectional dimension, e.g., a dimension, such as a maximum dimension, perpendicular to an elongated dimension (e.g., length) of a pore or a channel (such as a diameter of a pore or a channel), e.g., in the case of a high aspect ratio pore (when the ratio between the long and the short dimension of a pore is greater than 1.5). As such, in the embodiments discussed below, a pore or a channel may be characterized by one or more of its cross-sectional dimensions and its length.

The term "nanostructure" or "nanoscale" refers to a material structure having a size in each of the x-, y- and z-dimension that is less than 1 micron, e.g., in a range of about 100 nm to about 500 nm, or in a range of about 10 nm to about 150 nm, or in a range of about 3 nm to about 50 nm.

The term "microstructure" or "micron-scale" refers to a material structure having a size in each of the x-, y- and z-dimension that is equal to or greater than 1 micron and less than 1 mm.

The term "filter," as used herein, refers to a device that removes a contaminant from the air by retaining and/or eliminating the contaminant. Filters include, but are not limited to, high-efficiency particulate absorbing ("HEPA") filters, mechanical filters, sorption element filters, ionization and electrostatic filters, and photocatalytic filters.

The terms "surface nanostructures", "nanostructured features", "nanoscale features", "nano-features" "nano-roughness" are herein used interchangeably to refer to a nanoscale material structure having in some part surface morphology in shape of spikes, flower-like morphology, barbed morphology, needles, pillars, cones, a serrated cross sections, a tapered cylinder and other surface extrusions with dimensions in the range of 1 nm to 50 nm and the aspect ratio (defined as the ratio of the height to the base) is between 50 and 0.02.

As used herein, in some embodiments the term "about" means plus or minus 10% of the numerical value of the number with which it is being used. Therefore, in some embodiments about 100 μm means in the range of 90 μm-110 μm.

The terms microporous, mesoporous and macroporous are defined according to the International Union of Pure and Applied Chemistry definition, the pores are classified into micropores (<2 nm), mesopores (2-50 nm), and macropores (>50 nm). It has been discovered that it is often beneficial for porous materials to possess hierarchical pores across multiple length scales. Hierarchically porous materials must have at least bi-modal porosity.

The terms "treat" and "treatment" are used herein to refer to oxidation, reduction, inactivation, degradation, filtration, decomposition, and removal (e.g., sorption) (or a combination thereof) of a contaminant (e.g., gas, vapor, particulate matter, aerosol, bioaerosol, or pathogen) from a medium (e.g., a gas or liquid medium), including a flowing medium, e.g., in the form of a polluted stream. A filter used to treat a medium may have antiviral and/or antimicrobial properties.

Although some aspects have been described in the context of a system or an apparatus, it is clear that these aspects may also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Those having ordinary skill will appreciate that various changes may be made to the above embodiments without departing from the scope of the disclosure.

The foregoing description of the embodiments has been presented for purposes of illustration only. It is not exhaustive and does not limit the embodiments to the precise form disclosed. While several exemplary embodiments and features are described, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. As used herein, the singular forms "a," "an," and "the" may include the plural forms unless the context clearly dictates otherwise. Further, the term "coupled" does not exclude the presence of intermediate elements between the coupled items. Also, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or.

Moreover, if these terms are used, a set may include one or more members, and a subset of a set may include one or more than one, including all, members of the set.

The disclosed compositions of matter, systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments and may also include other parts not described in the embodiments. Accordingly, the embodiments are not limited to the above-described details, but instead are defined by the appended claims in light of their full scope of equivalents. Further, the present disclosure is directed toward all novel and non-obvious features and aspects of the various disclosed embodiments, alone and in various combinations and sub-combinations with one another.

While the present disclosure has been particularly described in conjunction with specific embodiments, many alternatives, modifications, and variations will be apparent in light of the foregoing description. It is therefore contemplated that the appended claims will embrace any such alternatives, modifications, and variations as falling within the true spirit and scope of the present disclosure.

What is claimed is:

1. A filter composition, comprising:

a filter medium, and an agglomeration of a plurality of porous microparticles coupled to said filter medium and forming a hierarchically porous material structure having a plurality of pores permitting fluid flow through the structure.

2. The composition of claim 1, wherein said microparticles comprise a biogenic material.

3. The composition of claim 2, wherein said biogenic material includes Diatomaceous Earth.

4. The composition of claim 1, wherein said microparticles comprise a synthetic material.

5. The composition of claim 1, wherein said microparticles include a combination of a biogenic material and a synthetic material.

6. The composition of claim 1, wherein at least one of said plurality of microparticles includes a first plurality of nanoscale features disposed on at least a portion of a surface thereof.

7. The composition of claim 6, wherein said at least one of the plurality of microparticles further includes a second plurality of nanoscale features disposed on at least a portion of a surface of the first plurality of nanoscale features.

8. The composition of claim 7, wherein said first plurality of the nanoscale features provides a first nanostructured coating.

9. The composition of claim 8, wherein said second plurality of nanoscale features provides a second nanostructured coating.

10. The composition of claim 8, wherein the first nanostructured coating is configured to provide any of a catalytic and a sorption function.

11. The composition of claim 10, wherein the first nanostructured coating is configured to provide sorption and storage of $CO_2$.

12. The composition of claim 10, wherein the first nanostructured coating is configured to provide sorption of at least one volatile organic compound.

13. The composition of claim 12, wherein the at least one volatile organic compound is formaldehyde.

14. The composition of claim 8, wherein the first nanostructured coating is configured to treat any of gaseous and particulate contaminants.

15. The composition of claim 8, wherein the first nanostructured coating has a thickness in a range of about 1 nm to about 50 nm.

16. The composition of claim 8, wherein the first nanostructured coating is at least partially coated with a second coating.

17. The composition of claim 16, wherein the second coating includes a second plurality of nanoscale features.

18. The composition of claim 16, wherein the second coating comprises an inorganic material.

19. The composition of claim 16, wherein the second coating is configured to enhance any of a catalytic function, a sorption function, and a biocidal function of the composition.

20. The composition of claim 6, wherein the first plurality of nanoscale features exhibits a barbed morphology.

21. The composition of claim 20, wherein the barbed morphology has a shape selected from the group consisting of a cone, a serrated cross section, a tapered cylinder and a spike.

22. The composition of claim 21, wherein said barbed morphology has a base with a size in a range of 1 nm to 10 nm and a height in a range of 1 nm to 50 nm.

23. The composition claim 20, wherein said barbed morphology has an aspect ratio in a range of 50 to 0.02.

24. A filtration system, comprising:

a filter medium, a granulated filtration material coupled to said filter medium, wherein said granulated filtration material includes an agglomeration of a plurality of porous microparticles forming a hierarchically porous material structure.

* * * * *